US011029243B2

(12) United States Patent
Yan et al.

(10) Patent No.: US 11,029,243 B2
(45) Date of Patent: *Jun. 8, 2021

(54) COMPACT DETECTION MODULE FOR FLOW CYTOMETERS

(71) Applicant: CYTEK BIOSCIENCES, INC., Fremont, CA (US)

(72) Inventors: Ming Yan, Pleasanton, CA (US); Yung-Chieh Hsieh, San Jose, CA (US); David Vrane, San Jose, CA (US); Eric Chase, Walnut Creek, CA (US)

(73) Assignee: Cytek Biosciences, Inc., Fremont, CA (US)

(*) Notice: Subject to any disclaimer, the term of this patent is extended or adjusted under 35 U.S.C. 154(b) by 323 days.

This patent is subject to a terminal disclaimer.

(21) Appl. No.: 15/659,610

(22) Filed: Jul. 25, 2017

(65) Prior Publication Data
US 2018/0024040 A1 Jan. 25, 2018

Related U.S. Application Data

(60) Provisional application No. 62/366,580, filed on Jul. 25, 2016.

(51) Int. Cl.
G01N 15/00 (2006.01)
G01N 21/00 (2006.01)
G01J 3/00 (2006.01)
G01N 15/14 (2006.01)
(Continued)

(52) U.S. Cl.
CPC ........... *G01N 15/1436* (2013.01); *G01J 1/08* (2013.01); *G01J 3/021* (2013.01); *G01J 3/0208* (2013.01);
(Continued)

(58) Field of Classification Search
CPC ............. G01N 2015/145; G01N 21/47; G01N 15/1436; G01J 3/0218; G01J 3/0291
See application file for complete search history.

(56) References Cited

U.S. PATENT DOCUMENTS 6,097,485 A 8/2000 Lievan
7,605,989 B1 10/2009 Sohn et al.
(Continued)

FOREIGN PATENT DOCUMENTS

WO WO-2012/055432 A1 5/2012
WO WO2015/156783 10/2015

OTHER PUBLICATIONS

Copenheaver, Blain R.; PCT/US2017/043815; International Search Report; dated Oct. 3, 2017; 1 page.
(Continued)

Primary Examiner — Nathan A Bowers
(74) Attorney, Agent, or Firm — Alford Law Group, Inc.; Tobi C. Clinton; William E. Alford

(57) ABSTRACT

In one embodiment, a flow cytometer is disclosed having a compact light detection module. The compact light detection module includes an image array with a transparent block, a plurality of micro-mirrors in a row coupled to a first side of the transparent block, and a plurality of filters in a row coupled to a second side of the transparent block opposite the first side. Each of the plurality of filters reflects light to one of the plurality of micro-mirrors and passes light of a differing wavelength range and each of the plurality of micro-mirrors reflects light to one of the plurality of filters, such that incident light into the image array zigzags back and forth between consecutive filters of the plurality of filters and consecutive micro-mirrors of the plurality of micromirrors. A radius of curvature of each of the plurality of micro-mirrors images the fiber aperture onto the odd filters and collimates the light beam on the even filters.

18 Claims, 14 Drawing Sheets
(4 of 14 Drawing Sheet(s) Filed in Color)

(51) Int. Cl.
 *G01J 1/08* (2006.01)
 *G01N 21/47* (2006.01)
 *G01J 3/02* (2006.01)
 *G01J 3/36* (2006.01)
 *G01N 15/10* (2006.01)
 *G01J 3/12* (2006.01)

(52) U.S. Cl.
 CPC ........... *G01J 3/0218* (2013.01); *G01J 3/0256* (2013.01); *G01J 3/0291* (2013.01); *G01J 3/36* (2013.01); *G01N 15/1434* (2013.01); *G01N 15/1459* (2013.01); *G01N 21/47* (2013.01); *G01J 2003/1213* (2013.01); *G01N 2015/1006* (2013.01); *G01N 2015/145* (2013.01)

(56) References Cited

U.S. PATENT DOCUMENTS

| | | |
|---|---|---|
| 8,184,298 B2 | 5/2012 | Popescu et al. |
| 2003/0190113 A1* | 10/2003 | Huang ................. G02B 6/3586 385/18 |
| 2005/0162648 A1 | 7/2005 | Auer et al. |
| 2005/0285020 A1 | 12/2005 | Murakami et al. |
| 2006/0273260 A1 | 12/2006 | Casstevens et al. |
| 2012/0050533 A1* | 3/2012 | Dewa ................. G02B 26/0833 348/143 |
| 2015/0247950 A1 | 9/2015 | Perkins |
| 2015/0271380 A1 | 9/2015 | Darty et al. |
| 2016/0154318 A1* | 6/2016 | Endres ............... G02B 26/0833 355/67 |
| 2019/0064535 A1* | 2/2019 | Anazawa .................. G01J 3/36 |

OTHER PUBLICATIONS

Copenheaver, Blain R.; PCT/US20171043815; Written Opinion of the International Searching Authority; dated Oct. 3, 2017; 6 pages.

Fisher, Brtitany; Office Action; U.S. Appl. No. 15/942,430; dated Jun. 25, 2020, 43 pages.

* cited by examiner

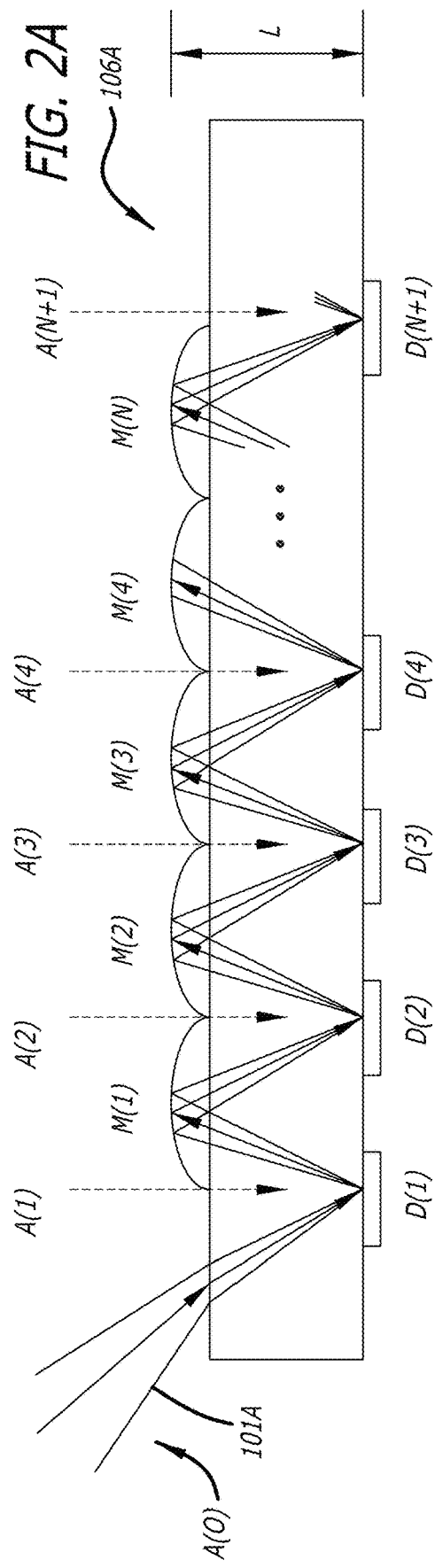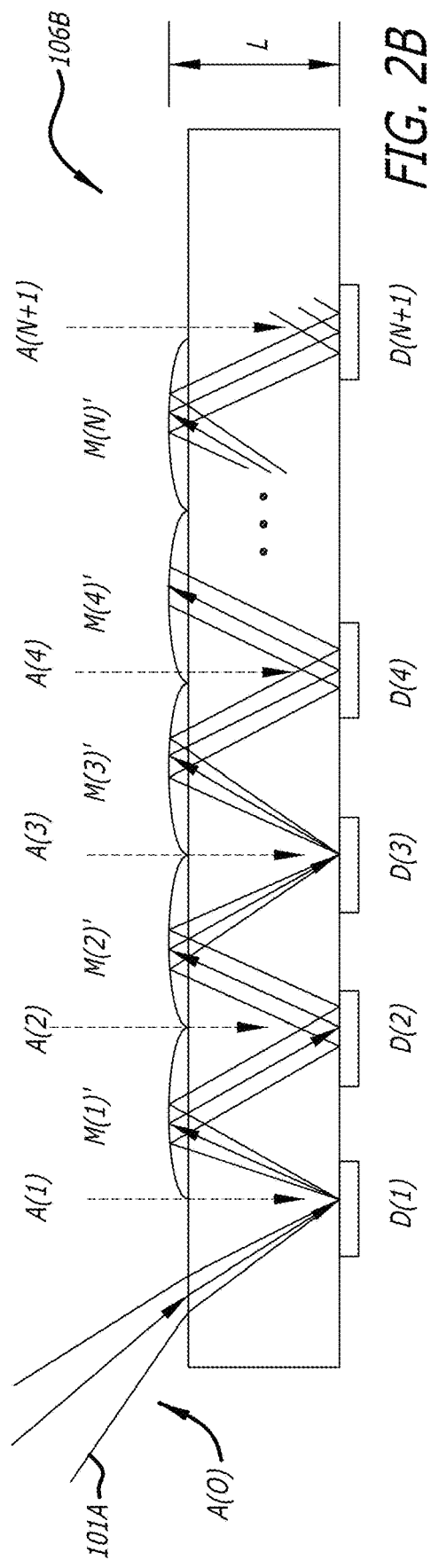

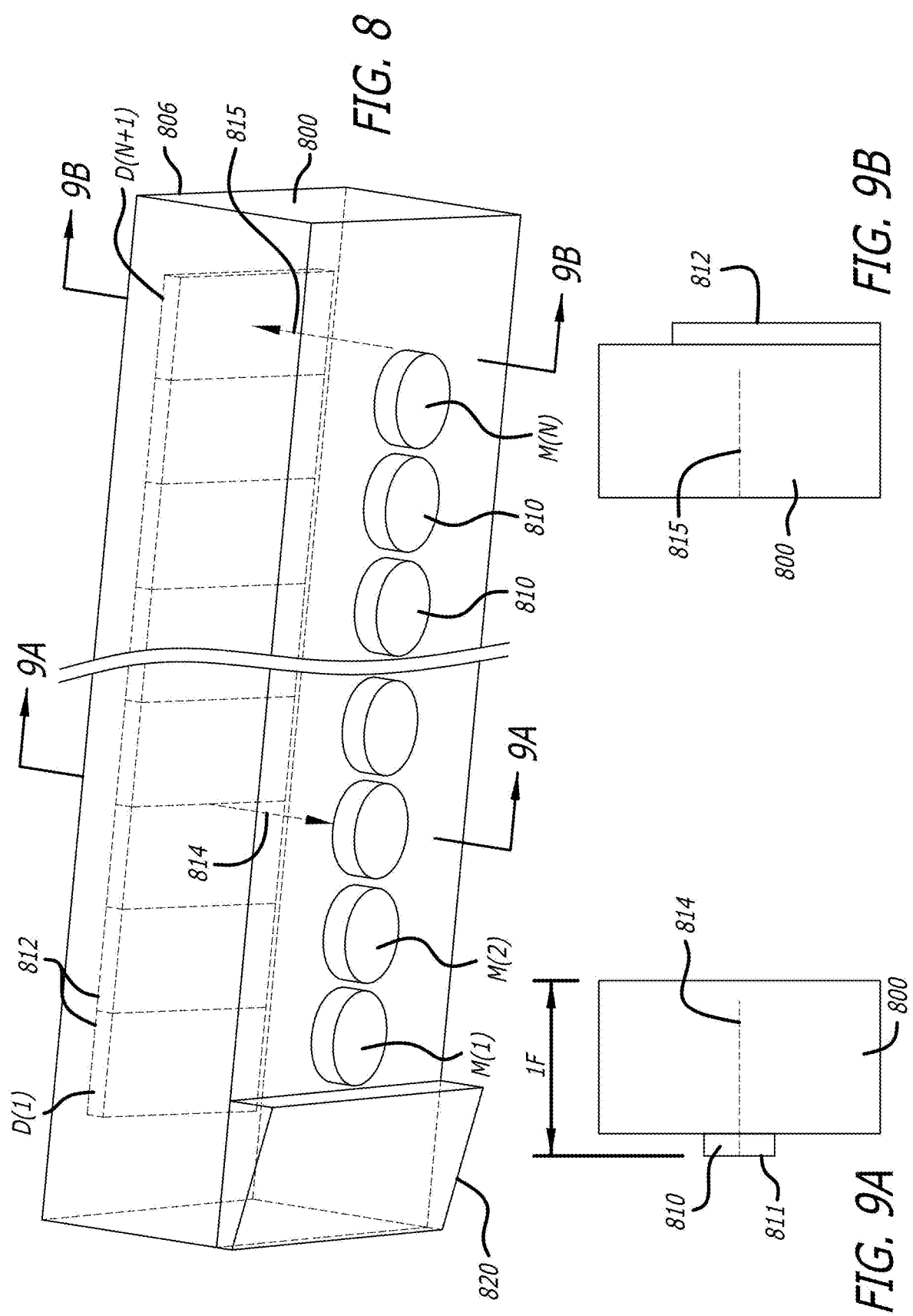

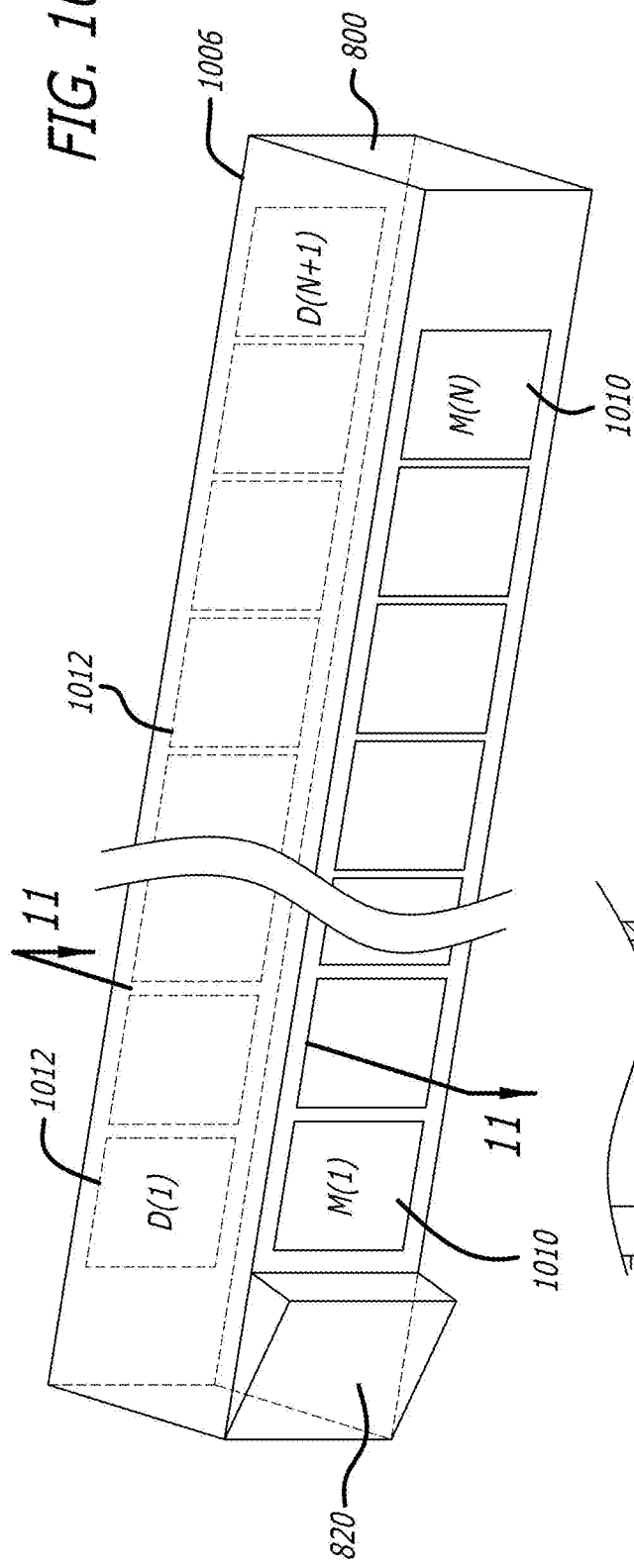
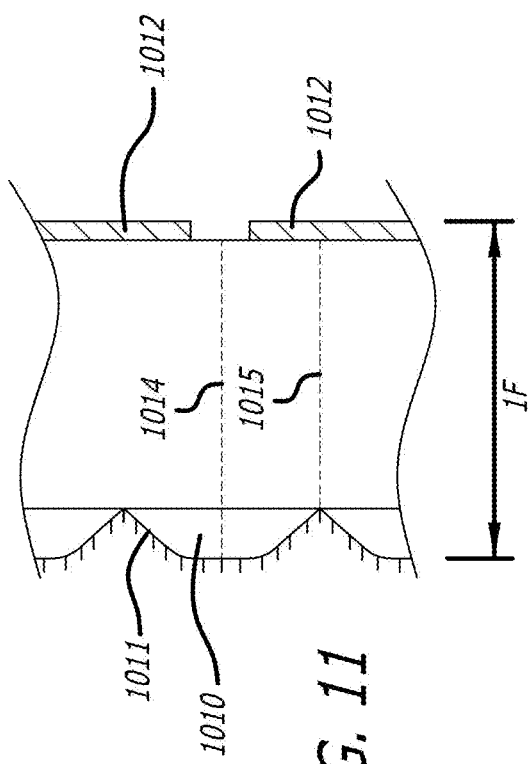

COMPACT DETECTION MODULE FOR FLOW CYTOMETERS

CROSS REFERENCE TO RELATED APPLICATION

This patent application claims the benefit of U.S. Provisional Patent Application No. 62/366,580 titled COMPACT DETECTION MODULE FOR FLOW CYTOMETERS filed on Jul. 25, 2016 by inventors Ming Yan et al., incorporated herein by reference for all intents and purposes.

This patent application is further related to application Ser. No. 15/498,397 titled COMPACT MULTI-COLOR FLOW CYTOMETER filed on Apr. 26, 2017 by David Vrane et al. that describes a flow cytometer into which the compact detection module may be used and is incorporated herein by reference for all intents and purposes.

FIELD

The embodiments of the invention relate generally to detection modules of flow cytometers.

BACKGROUND

A flow cytometer generally has a viewing orifice that is illuminated by one or more lasers. The laser light from the one or more lasers strikes various fluorochrome-labelled particles passing through the orifice. The fluorochrome-labelled particles are typically various biological cells in a sample labeled with different flourochromes (fluorescent dyes) that can be analyzed to obtain information about the sample that can be generalized to the whole. One or more optical detectors in the flow cytometer are used to sense the fluorescence (fluorescent light) that is emitted from the fluorochrome-labelled particles passing through the orifice that are struck by the laser light from the one or more lasers.

One or more different optical filters can be arranged before the emitted fluorescence from the fluorochrome-labelled particles reaches each detector. The optical filters are arranged in the emission fluorescence path such that each detector sees only a specific bandwidth of light associated with expected fluorescence of flourochromes. That is, the bandwidth of any given filter takes advantage of a peak in the emission spectra of a specific fluorescent dye. In this way, for any given particle, the collective signal from the detectors indicates the type of flourochrome or fluorochromes attached to a particle. The signals detected by the detectors from the emitted fluorescence allows quick and comprehensive cellular classification of the various particles in the sample.

However, emission spectrum can overlap between dyes. This limits the number of different fluorochromes that can be simultaneously detected on a given particle by a single laser and detector. Because emission bandwidths typically range in wavelengths between 30 nanometers (nm) and 60 nm, conventional flow cytometers can usually detect no more than for four or five fluorochromes per laser line. Increasing the number of lasers provides an expedient but costly way to increase the number of fluorochromes that can be simultaneously detected.

Further complicating detection of the emitted fluorescent light is the fact that many dyes used to stain particles are excited over a range of laser wavelengths differing from and greater than the typical 30 nm to 60 nm bandwidth range. This can lead to signal crosstalk between detectors for the different lasers.

Prior flow cytometry fluorescence detection systems limited the divergence by increasing the collimating lens focal length. However, this resulted in a larger diameter light beam that limited the number of detectors, such as to six detectors, depending on the size of the final image required. In these prior flow cytometry systems, the final image size was constrained by optical aberrations in collimating a large size of optical imaging, such as 800 micro-meters or microns (um), and broad band light (e.g., 400 nm-800 nm in wavelength) into a set of detectors that has a size less than 3 millimeter (mm) in diameter.

In another flow cytometry system, the incident light is re-imaged using spherical micro-mirrors for each detector in a detector chain of a set of detectors in a row. Re-imaging avoids the diverging collimated light problem of the above mentioned flow cytometry system. However, the number of detectors is limited by the aberration introduced by reflections from the spherical micro-mirrors. Since the image size increases along the detector chain, to increase the number of detector channels down the row in the detector chain, large area detectors are required resulting in a large flow cytometer that is bulky and expensive.

Resolution of spectrally overlapping emission spectra is also central to increasing the number of detectable fluorochromes. A detector array can be used to identify fluorochromes based on a collective emission signature across multiple wavelengths to increase the number of detectable fluorochromes. In essence, the entire fluorescence signal is chromatically dispersed into an array of detectors either by diffraction grating or prisms. In this way, the entire emission spectra is discretized across the detectors. Spectral deconvolution (unmixing) can be used to calculate the contribution of the known individual fluorochrome spectra to the total collected signal. However, this approach to increasing the number of detectable fluorochromes has two major limitations.

The continuous, linear characteristics of a dispersion-element/detector array does not allow for bandwidths to be adjusted to take advantage of the true nature of fluorochrome spectra. Accordingly, the recognition of the wider bandwidth favors longer wavelength fluorochromes while overlooking details of shorter wavelength fluorochromes with compressed spectra. Additionally, scattered light from other lasers, if present, is unavoidably collected by the array of detectors. This scattered light compromises the fluorescence signal that is to be detected by a detector.

Accordingly, there is a need for further improvement in a flow cytometer to increase the number of detectable fluorochromes and better analyze fluorochrome-labeled particles in a sample.

BRIEF SUMMARY

The embodiments of the invention are summarized by the claims that follow below.

BRIEF DESCRIPTIONS OF THE DRAWINGS

This patent or application file contains at least one drawing executed in color. Copies of this patent or patent application publication with color drawing(s) will be provided by the United States Patent and Trademark Office upon request and payment of the necessary fee.

FIG. 2A is a schematic diagram of an image array with successive channel reimaging.

FIG. 2B is a schematic diagram of a 1f image array with alternate channel reimaging.

FIG. 8 is a perspective view of a 1f image array with spherical micro-mirrors.

FIGS. 9A-9B are cross section views of the 1f image array of FIG. 8.

FIG. 10 is a perspective view of a 1f image array with concave rectangular micro-mirrors.

FIG. 11 is a top side view of a portion of the 1f image array of FIG. 10.

DETAILED DESCRIPTION

In the following detailed description of the embodiments, numerous specific details are set forth in order to provide a thorough understanding. However, it will be obvious to one skilled in the art that the embodiments can be practiced without these specific details. In other instances well known methods, procedures, components, and circuits have not been described in detail so as not to unnecessarily obscure aspects of the embodiments of the invention.

The embodiments of the invention include a method, apparatus and system for a flow cytometer with a compact highly multiplexed detection module.

A flow cytometer with a compact detection module for fluorescence is disclosed with an increased numbers of detectors and a minimal image size at the detectors compared to prior flow cytometers. Each detector module is fed by at least one laser. Multiple lasers can be supported by multiple detector arrays in a compact manner. The increased number of detectors is made possible by careful control of incremental aberrations in the detector array as light is transmitted through the detection chain. The compact size of the compact detection module is achieved by a reduced distance between the micro-mirrors and filters and careful downward scaling, thereby minimizing image degradation down the row or chain of micro-mirrors and filters in the imaging array.

Prior limitations can be overcome by use of an optical system with multiple individual detectors and an adjustable progression of filter bandwidths. The optical system enables a concentration of spectral collocation points to best resolve spectra of both long and short wavelength dyes used to mark the particles analyzed by the flow cytometer. Fluorescence from excited particles are imaged into a multimode fiber by an objective lens with a high numbered aperture (NA). The broadband fluorescence exiting the multimode fiber is collimated and then coupled into (imaged onto) multiple detectors. Collimation of the broadband fluorescent light exiting the multimode fiber is a challenge.

Figure 1:
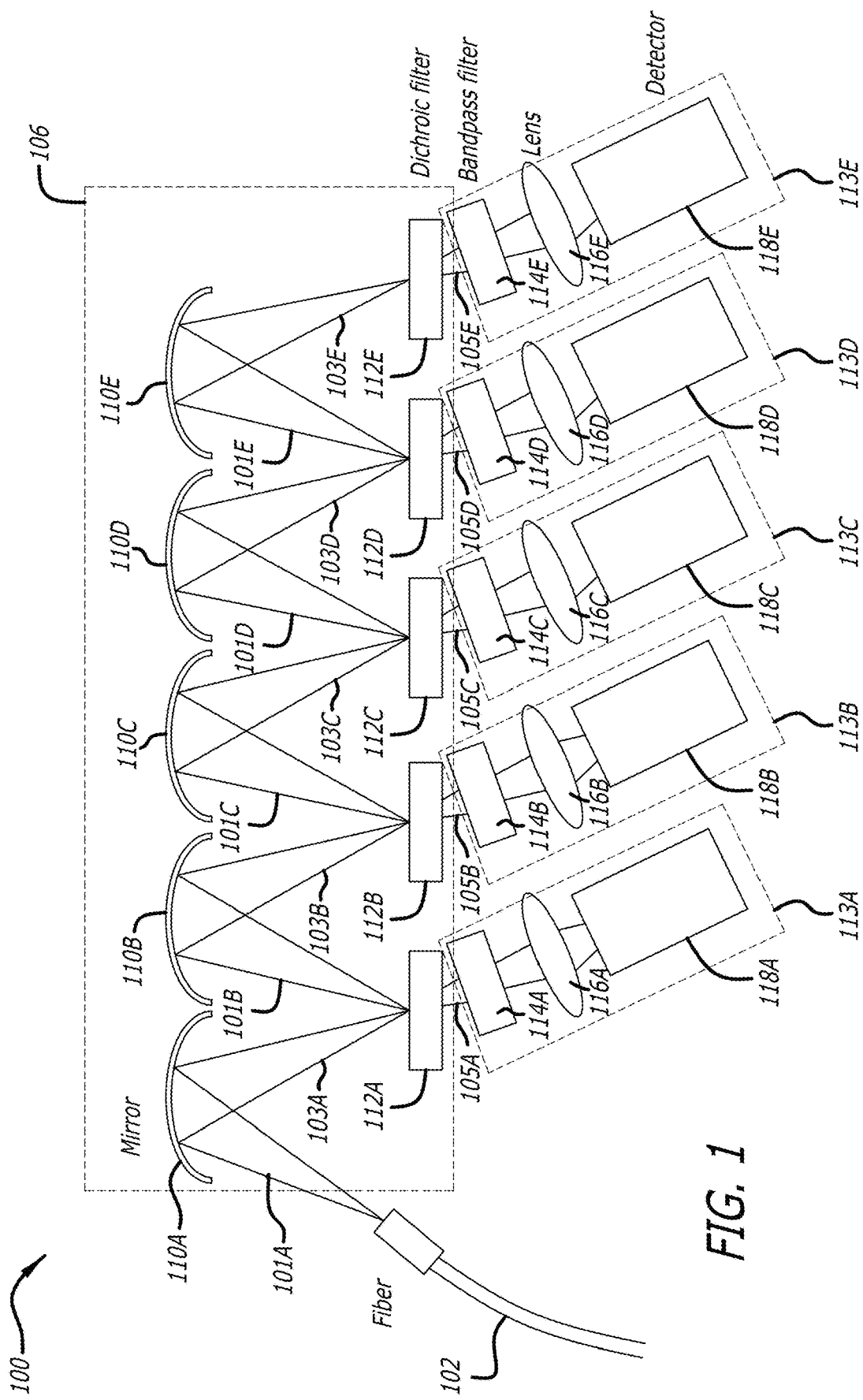
FIG. 1 is a block diagram of a detection module of a flow cytometer system.

Referring now to FIG. 1, a functional block diagram of a detection module 100 for flow cytometers is shown. An advanced flow cytometer can include a plurality of detection modules. The detection module 100 is a wavelength de-multiplexing system. The detection module 100 successively reflects and reimages the fluorescent light output 101A from an optical fiber 102 in an image array 106. The image array 106 is a mechanical image array including a plurality of reflective mirrors 110A-110E and a corresponding plurality of long-pass dichroic filters 112A-112E suspended in air by mechanical mounts. Generally, a dichroic filter is an accurate color filter used to selectively pass light of a range of wavelengths of color light while reflecting other wavelengths of color light. Alternatively, the plurality of long-pass dichroic filters 112A-112E can be band pass filters.

The image array 106 is capable of reflectively reimaging a fiber spot of light N times (where N is greater than 2) while maintaining the optical quality of the fiber spot at the end of the image array. Reimaging is function of recreating the original image with some aberration, a reimage, at a surface such as that of each of the dichroic filters 112A-112E. The detection module 100 further includes a plurality of detector channels 113A-113E respectively comprising a plurality of objective lenses 116A-116E, and a plurality of detectors 118A-118E with light being in communication with each. Optionally, the plurality of detector channels 113A-113E can further include a plurality of bandpass filters 114A-114E respectively to be sure the various desired wavelength ranges are detected by the plurality of detectors.

In the image array 106, the light 101A that is incident onto the first mirror 110A is reflected by the mirror into reflected light 103A. The reflected light 103A from the first mirror 110A passes through air and is incident upon a first long-pass dichroic filter 112A. The light 103A from the first mirror 110A is split up by the long-pass dichroic filter 112A into a continued light portion 101B and a pass-through or transmitted light portion 105A. The continued light portion 101B passes through air and is incident upon the next mirror in the series, mirror 110B. The transmitted light portion 105A is coupled into the first bandpass filter 114A of the first detector channel 113A. The transmitted light portion 105A is cleaned up by the bandpass filter 114A and then coupled into the optical detector 118A by the objective lens 116A. This process repeats for each stage (detector channel) in the image array 106.

The image array 106 includes five stages that reimages five times on each long-pass dichroic filter. It is still desirable to include a greater number of detectors. However, after more than 5 reimages, beam distortion through the reflective mirrors can accumulate to the point where the image quality at the last dichroic filter becomes highly deteriorated. To make the zigzag configuration between mirrors and dichroic filters in the image array 106 perform properly with a greater number of detectors, it is desirable to minimize image degradation along the light path.

Minimizing image degradation in a detection module can be achieved using two mechanisms. If the bending power of each reflective mirror in the image array is reduced (e.g., by a factor of two—one half the bending power), image degradation can be reduced. If the number of times that the light beam is reimaged in the image array is reduced (e.g., by a factor or two—one half the number of times) image degradation can be further reduced.

Reducing the bending angle at the mirrors reduces aberrations of all types. Since aberrations increase non-linearly with bending angle, the improvement gained by switching from "fast focus mirrors" to "slow focus mirrors" is significantly better than 2×, allowing retention of image quality through many more reflections. The image quality incident on a last detector in a chain of detectors can be further improved by reducing the number of times a light beam is re-imaged in the image array. Instead or re-imaging at each dichroic filter for each detector channel, the incident light can be reimaged on every other dichroic filter and detector channel (e.g., odd detector channels).

Reference is now made to FIGS. 2A-2B to describe image arrays 106A-106B providing an improvement in image quality by using a transparent block with micro-mirrors having differing radius of curvature. Generally, the image array consists of an array of micro-mirrors and an opposing array of bandpass and/or dichroic filters for each detection channel. The thickness L of the transparent block between the serial chain or row of micro-mirrors M(n),M(n)' on one side and the serial chain or row of dichroic filters D(n) on the opposing side in each case is the same. However, the focal lengths of the micro-mirrors M(n) and M(n)' differ in the image arrays 106A-106B of FIGS. 2A-2B.

The focal length f of the micro-mirrors M(n)' in FIG. 2B is L while the focal length f of the micro-mirrors M(n) in FIG. 2A is one half L. The larger focal length of the micro-mirrors M(n)' in the image array 106B reduces the bending angle and aberrations in the imaging along the serial chain of mirrors. Furthermore, the image array 106B is a 1f image array with the given the thickness L of the transparent block and the focal length of the micro-mirrors M(n)' such that reimaging occurs on odd dichroic filters, such as dichroic filters D(3), D(5), D(7), through D(n).

In FIGS. 2A-2B, spot A(1) through spot A(n) are the spot sizes (area) respectively on the dichroic filters D(1) through D(N). Spot A(0) is the fiber aperture of the multi-mode fiber from which the fluorescent light is input into each array 106A-106B. In FIGS. 2A and 2B, the fiber aperture can be considered to be infinitesimally small to illustrate the image conjugation properties of the two designs.

FIG. 2A illustrates an image array 106A having a plurality of micro-mirrors M(1) through M(N) and a plurality of long pass dichroic filters D(1) through D(N), where N is a whole number value greater than one representing the number of detector channels. Through reflection by the micro-mirror M(1), light focused at a spot A(1) at dichroic filter D(1) is re-imaged through reflection of micro-mirror M(1) to focus the light at spot A(2) at dichroic filter D(2). This is repeated by each of the micro-mirrors M(2) through M(N) down the serial chain or row. The image array 106A is a 2f image array.

FIG. 2B illustrates a 1f design for an image array 106B with a plurality of micro-mirrors M(1)' through M(N)' and a plurality of long pass dichroic filters D(1) through D(N). The micro-mirrors M(1)' through M(N)' have a different radius of curvature than the radius of curvature of micro-mirrors M(1) through M(N). The 1f image array 106B provides an improvement in image quality at the detectors (e.g., detectors 118A-118E in FIG. 1) over that of 2f image array 106A.

The chain of micro-mirrors M(1)' through M(N)' in the 1f image array 106B are designed to relay an image down the chain through the property of telescope optics. For example, light focused at spot A(1) at the dichroic filter D(1) is imaged to spot A(3) at the dichroic filter D(3) through a telescope effect of micro-mirrors M(1)' and M(2)'. The even spot, Spot A(2), is an intermediate spot in the collimating space.

The plurality of long-pass dichroic filters D(1) through D(N) can alternatively be passband or bandpass optical filters or include both a dichroic optical filter and a bandpass optical filter in combination together to assure a limited range of wavelengths of light pass through. Dichroic optical filters use the principle of thin-film interference and can also be referred to as an interference filter. For each channel, the bandpass or passband optical filter is tuned to pass a different selected range of wavelength of light (the passband) to each detector and reflect the rest of the light wavelengths back to a micro-mirror in the micro mirror array.

To provide a compact detector module, the image array 106B is formed out of a solid transparent material such as further explained with reference to FIGS. 8 and 10. The solid transparent material of the transparent imaging block used for the 1f image array can be clear glass or clear plastic, for example, with mirrors and dichroic filters formed into or on the transparent material.

The design of 1f image array 106B and the design of 2f image array 106A can be compared, under the conditions of the same thickness of the solid transparent material, the same pitch and the same incident angle. The path distance between adjacent micro-mirrors in the 2f image array 106A and 1f image array 106B is similar. In this case, the path distance is the physical distance, not the conventional path length, where the refraction index of the material is taken into account. However, the focal length of micro-mirrors in the 2f image array 106A is shorter (one half) than the focal length of the micro-mirrors in the 1f image array 106B. Stated differently, the actual focal length of the micro-mirrors in the 1f image array 106B is twice that of the focal length of the micro-mirrors in the 2f image array 106A due to the different radius of curvatures in the micro-mirrors. A longer focal length reduces the bending power in each reflection, which minimizes the aberration introduced in the micro-mirror reflection. Accordingly, the aberrations in the 1f image array 106B are improved over those of the 2f image array 106A.

In the 2f image array system 106A, the fiber aperture A(0) is imaged to spot A(1) at the dichroic filter D(1). The image at spot A(2) is a re-image of spot A(1) through reflection of micro-mirror M(1). Continuing through the zigzag light path in the array 106A, each spot A(n) at each dichroic filter D(n) is imaged by the next micro-mirror M(n) to the next spot A(n+1) at the next dichroic filter D(n+1). In this configuration, the path distance between spot A(n) and micro-mirror M(n) is the thickness L of the transparent block which is 2 times (twice) the focal length of the micro-mirrors M(n).

In the 1f image array system 106B, light from the fiber aperture A(0) is imaged down to a spot A(1) at the dichroic filter D(1) by an input channel. In the image array system 106B, one can consider that the light path from micro-mirror M(1)' to micro-mirror M(2)' forms the equivalence of a telescope with a magnification equal to 1. In such a case, the spot A(1) is imaged to spot A(3) through the telescope of micro-mirrors M(1)' and M(2)' with spot A(2) being the intermediate spot in the collimating space. Adjacent micro-mirrors M(3)' and M(4)' form another telescope to reimage spot A(3) to spot A(5). Continuing the zigzag path in in the imaging array 106B, the odd spots A(1), A(3), A(5) . . . A(2n+1) are all conjugated to each other, with the even spots A(2), A(4), A(6), . . . A(2n) being intermediate spots in the collimating space. In this configuration, the path distance between spot A(n) and micro-mirror M(n)' is the thickness L of the transparent block which is one focal length of the micro-mirrors M(n)'.

Each spot on the filter is formed by a bunch of light rays. The angular distribution of the bunch of light rays is determined by the numerical aperture (NA) of the input multimode-fiber 102 and the input channel to the imaging array of the imaging system. The cone-angle of light at spot A(1) is proportional to the numerical aperture of the multimode fiber 102. If the image magnification m from the fiber aperture A(0) to the spot A(1) is a ratio of 1 to m, where m is greater than one, then the cone angle at spot A(1) is smaller than the cone angle at the fiber aperture A(0) by a factor of m.

In the 2f image array system 106A of FIG. 2A, the image magnification from any spot A(n) to the adjacent spot A(n+1) is equal to one, for any value of n. Disregarding the aberration, the cone angle of rays at the dichroic filters D(1) through D(N+1) of the image array system 106A are the same for all detector channels.

Referring now to FIG. 2B, the distance between the dichroic filter D(1) and the micro-mirror M(1)' is L. If the total number of channels N is an even number in the 1f image array 106B, the spot A(1) is imaged to spot A(3) through micro-mirrors M(1)'-M(2)' (considering a 1× telescope), and spot A(2) at dichroic filter D(2) is in the collimating space. A portion of the collimated light at spot A(2) is reflected by the dichroic filter D(2) towards the micro-mirror M(2)'.

Figure 5:
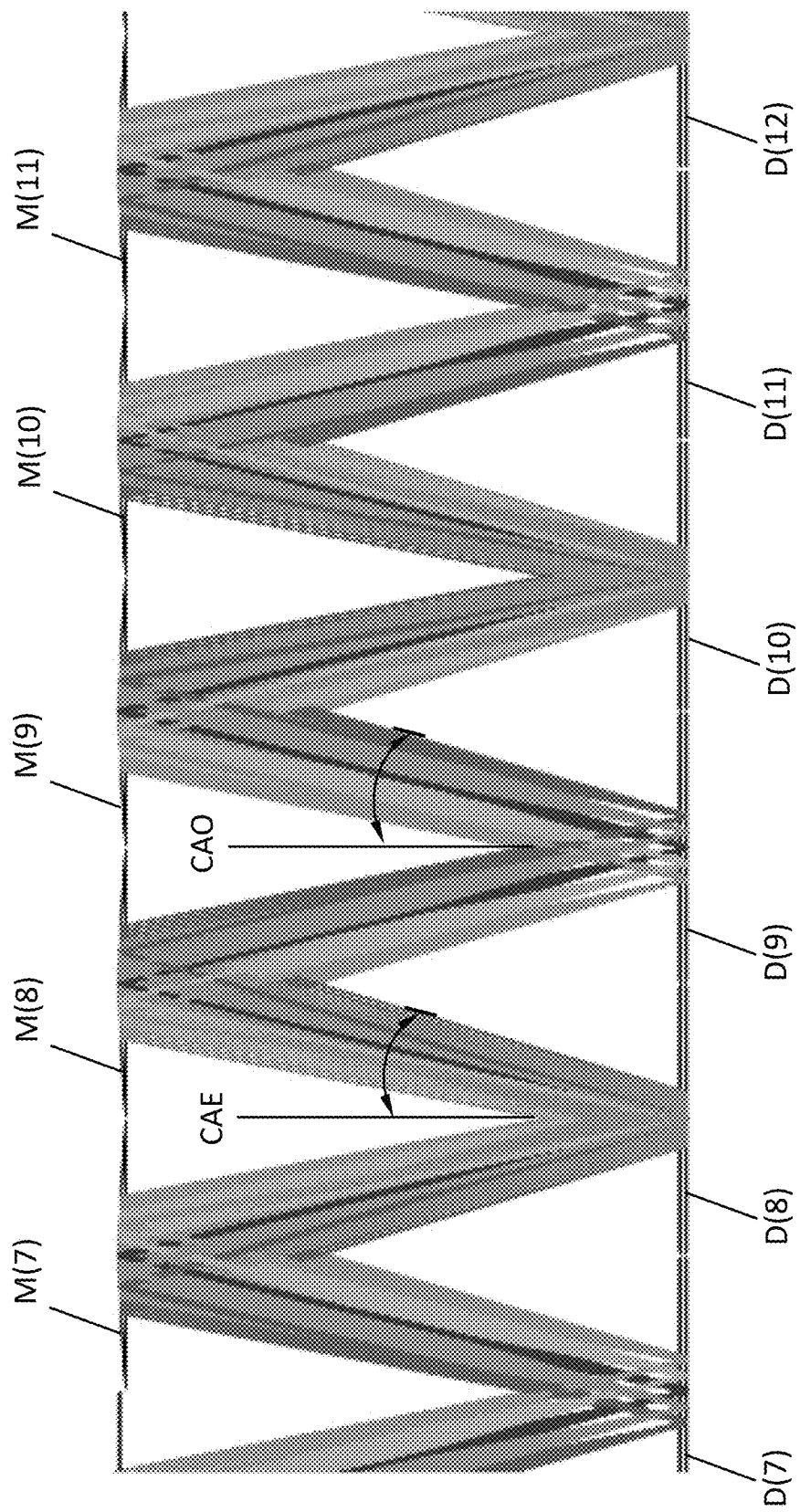
FIG. 5 is a magnified view of a portion of the 1f image array.

Accordingly, the 1f image array 106B has odd detector channels at spots A(1), A(3), . . . A(2k−1) . . . through A(N−1) and even detector channels at spots A(2), A(4), . . . A(2k), . . . through A(N), where 1≤k≤(N/2). Since spot A(1) is in the front focal point of micro-mirror M(1)', and the path distance between adjacent micro-mirrors is twice the focal length, all the odd spots A(1), A(3), A(5) . . . A(2n+1) are the images of the fiber aperture (as indicated in FIG. 2B by light ray convergence to the odd spots), and all the even spots A(2), A(4), A(6), . . . A(2n) are in the collimating space (as indicated in FIG. 2B by the parallel light rays at the even spots). Accordingly, as shown in FIG. 5, the cone angle of odd spots (the odd cone angle CAO) for odd detector channels is different from the cone angle of even spots (the even cone angle CAE) for the even detector channels.

In the 1f image array 106B, the center wavelength and passband width of each optical dichroic filter D(1) through D(N) differs from each other. The center wavelength and passband width of each optical dichroic filter are designed for optimized sampling of the fluorescence spectrum of dye to yield better accurate unmixing of a large quantity of different dyes. For example, assuming a fluorescence spectrum of light wavelengths from 400 nm to 800 nm and a sixteen (16) channel detection module, a bandwidth of 25 nm in light wavelength can be analyzed by each. For example, the first detector channel and the first dichroic filter D(1) can bandpass and analyze light wavelengths from 400 nm to 425 nm with a center wavelength of 412.5 nm. Wavelengths outside 400 nm to 425 nm are substantially filtered out and not passed onto the first detector in the first detector channel. A second detector channel and the second dichroic filter D(2) can bandpass and analyze light wavelengths from 425 nm to 450 nm with a center wavelength of 437.5 nm and increasing so on and so forth for each detector channel. The last or sixteenth detector channel and sixteenth dichroic filter D(16) can bandpass and analyze light wavelengths from 775 nm to 800 nm with a center wavelength of 787.5 nm.

The characteristics of the 1f image array 106B allow the initial optical signal to be propagated into a greater number of detectors than the 2f image array 106A. The 1f image array 106B reduces the off-axis aberration through reducing the bending power in each mirror reflection. However, with the odd cone angles CAO being different from the even cone angles CAE at the dichroic filters in the odd and even channels, one needs to determine an optimum magnification m in an input stage from the fiber aperture A(0) to the spot A(1) at the dichroic filter D(1). For a given fiber numeric aperture (NA) and aperture diameter, the magnification m from the fiber aperture A(0) to the spot A(1) at the dichroic filter D(1) is optimized for both odd and even detector channels in the 1f image array 106B.

From the spectrum resolution point of view, dichroic filter performance degrades as the cone angle of the incident spot increases. In the 1f image array 106B, the cone angle of spots in odd channels are different from that in the even channels. Basically, the cone angle in the odd channels is determined by the numeric aperture (NA) of the multi-mode fiber and the magnification factor m from fiber aperture A(0) to the spot A(1) at the dichroic filter D(1). In contrast, the cone angle of even channels is determined by the spot diameter of spots in the odd channels.

In the input channel, assume the image magnification is m from aperture A(0) at the fiber to spot A(1) at the dichroic filter D(1). At the even detector channel (dichroic filters D(2k)), the cone angle is proportional to the magnification m. However, in the odd detector channels (dichroic filters D(2k−1)), the cone angle is inversely proportional to the magnification m. A larger magnification from the fiber aperture A(0) to the spot A(1) results in a smaller cone angle at odd detector channels (dichroic filters D(2k−1)) but a larger cone angle at the even detector channels (dichroic filters D(2k)). In one example embodiment having a multi-mode fiber with NA=0.12, aperture diameter 600 um, and a micro-mirror (filter) pitch of 5.5 mm; the recommended magnification m was modeled to be approximately 2. Obviously, other magnifications m can be determined with different inputs and thus the embodiments disclose herein are not limited to a 2× magnification. In the example presented for the 1f image array 106B, both the numeric aperture (NA) and the number of reimages is reduced by a factor of 2, allowing for at least four times (4×) more detectors along a row of the same length than the 2f image array 106A.

FIGS. 3, 4A-4B, and 5 illustrate graphs of simulation results of a compact detection module with the 1f image array 106B and example input values of an embodiment having a fiber with NA=0.12, an aperture diameter 600 um, a micro-mirror (filter) pitch of 5.5 mm; and a recommended magnification of 2×. The different colors of light rays shown in FIGS. 3, 4A-4B, and 5 are for clarity only to show how light at the different positions pass through the detector module.

Figure 3:
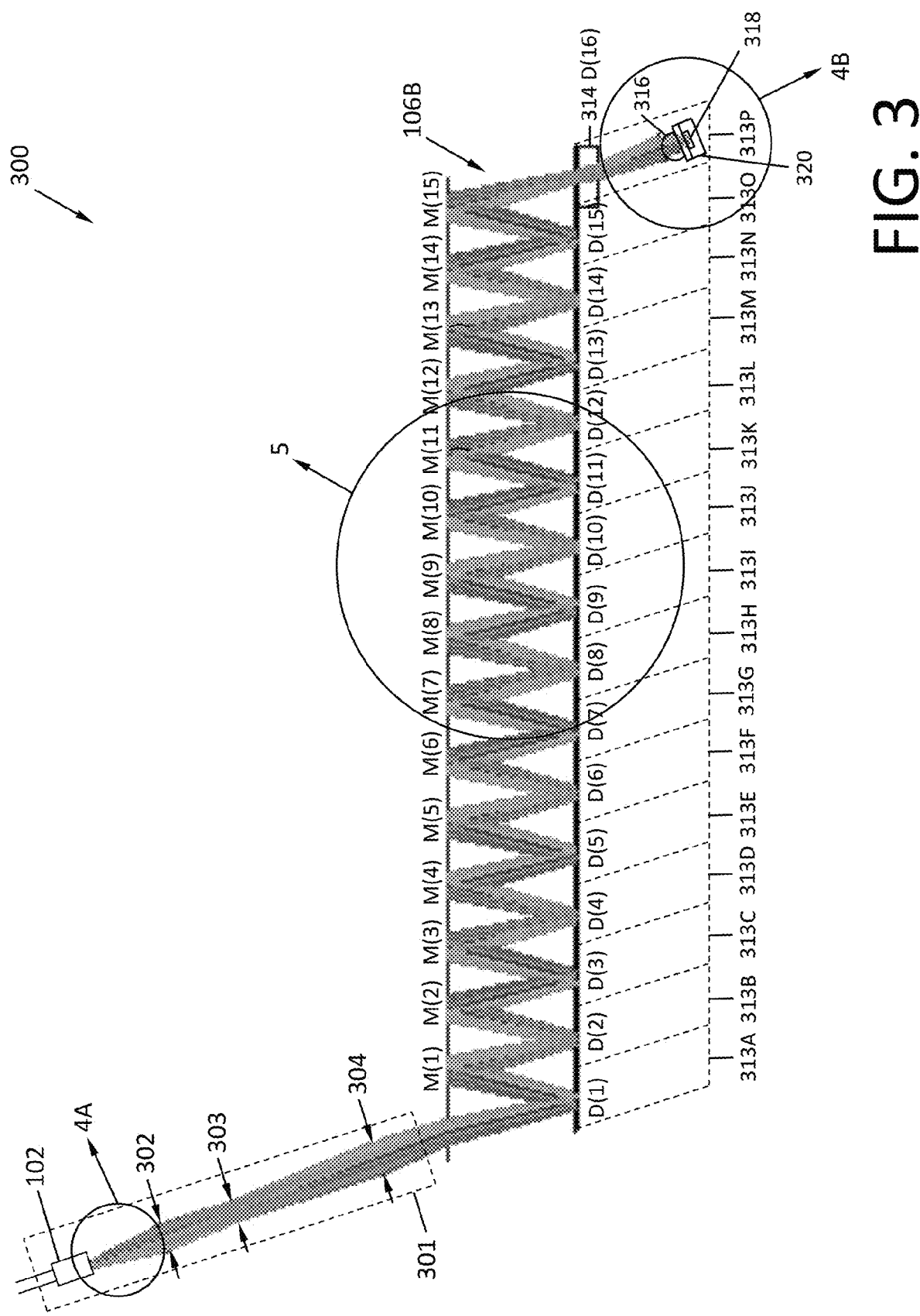
FIG. 3 is a schematic diagram of a compact detection module including a 16 channel 1f image array for a modular flow cytometer system.

FIG. 3 shows one end of the optical fiber 102 that launches fluorescent light into the detection system. Near the opposite end (not shown) of the optical fiber 102, a collection objective lens with a high NA can be used to collect the fluorescent light from an aperture and couple it into the opposite end of the optical fiber. The optical fiber 102 then collects the light from the objective lens and directs it to the end shown in FIG. 3. Near the end shown in FIG. 3, the system can include a fiber numeric aperture converter to lower the numeric aperture into free space to launch the fluorescent light to the detector array.

Referring now to FIG. 3, the magnification m in the compact detection module 300 is achieved by an input stage

301. The input stage 301 includes a collimating lens 302, a blocking filter 303, and a focusing lens 304. The magnification, m, is achieved by adjusting the ratio of focal lengths of the collimating lens 302 and focusing lens 304. For instance, to set the magnification equal to 2 (m=2), the focal length of focusing lens 304 is twice that of the collimating lens 302. The input channel 301 may be considered to further include an input portion of a transparent block (e.g., wedge, block thickness, see FIG. 8) in the image array 106B before the first dichroic filter D(1) is reached.

The collimating lens 302 receives the light launched from the fiber 102 and collimates the light. The collimated light is passed through the blocking filter 303 and input into the focusing lens 304. The blocking filter 303 is used to clean out the laser light that is scattered into the collection optics near the opposite end of the optical fiber 102. The fluorescent spectrum of light associated with the fluorochromes passes through the blocking filter 303 and into the focusing lens 304. The focusing lens 304 focuses the fluorescent spectrum of light onto the first dichroic filter D(1) in the image array 106B to form an image at spot A(1). The image at spot A(1) is magnified in size (e.g., diameter and area) from the size at the aperture A(0) at the fiber by the factor m. The position of the lenses 302,304 between the end of the fiber 102 and the image array 106B can be adjusted.

Figure 6:
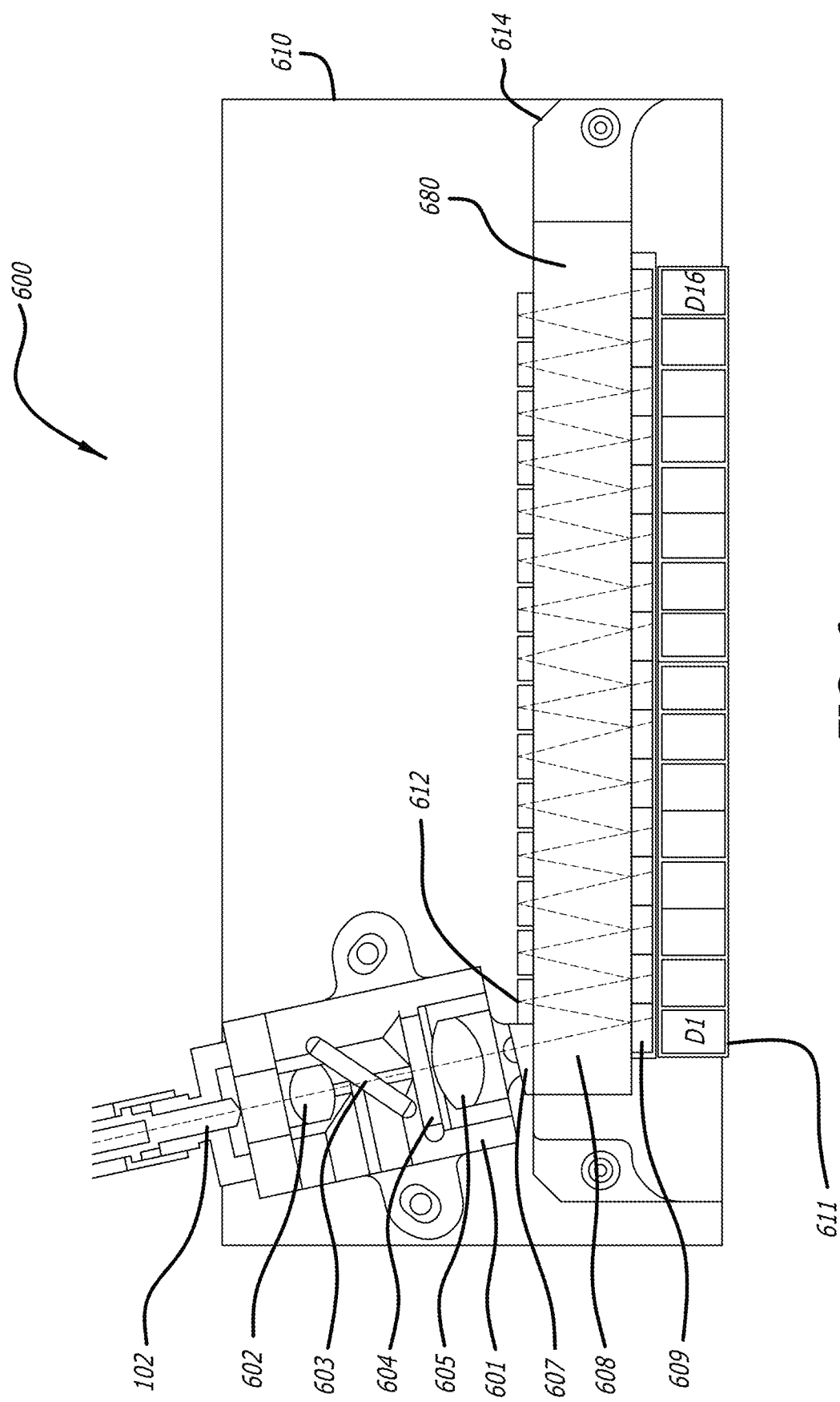
FIG. 6 is a diagram of a detection module in a modular flow cytometer system with a 16 channel 1f image array and 16 detector channels.

The compact detection module 300 further includes a sixteen (16) channel 1f image array 106B and sixteen (16) detector channels 313A-313P in communication with the image array 106B (e.g., see FIG. 6). In an alternate embodiment, a pair of eight (8) channel 1f image arrays (e.g., see FIGS. 7A-7C) can be used in parallel to relax the imaging requirements of each compact image array. In a flow cytometer, more than one of these compact image arrays (e.g., three) can be used to multiply the number of detector channels to be greater than sixteen (e.g., three times sixteen for forty detection channels) such as explained with the detector modules described with reference to FIG. 13).

The image array 106B is formed out of a solid transparent block material. The sixteen (16) channel 1f image array 106B includes sixteen (16) dichroic filters D(1) through D(16) on one side of the transparent block, and fifteen mirrors M(1) through M(15) on an opposite side. The image array does not need a mirror to follow after the last detector channel 313P. Moreover, the last filter D(16) 314 may not be a dichroic filter; instead a bandpass filter can be used. In the case of the bandbass filter, the incident light need not be further reflected to another mirror or filter.

Each detector channel 313A-313P (collectively referred to as detector channel 313) in the array or detectors includes a focusing lens 316, and a detector 318 (an instance is shown in FIG. 3). The detector 318 is packaged in a thin outline (TO) can package 320 with the focusing lens 316 coupled to or integrated into the TO can package. The focusing lens 316 focuses the fluorescence light passing through the filter down onto a small area size of the detector 318.

Figure 4A:
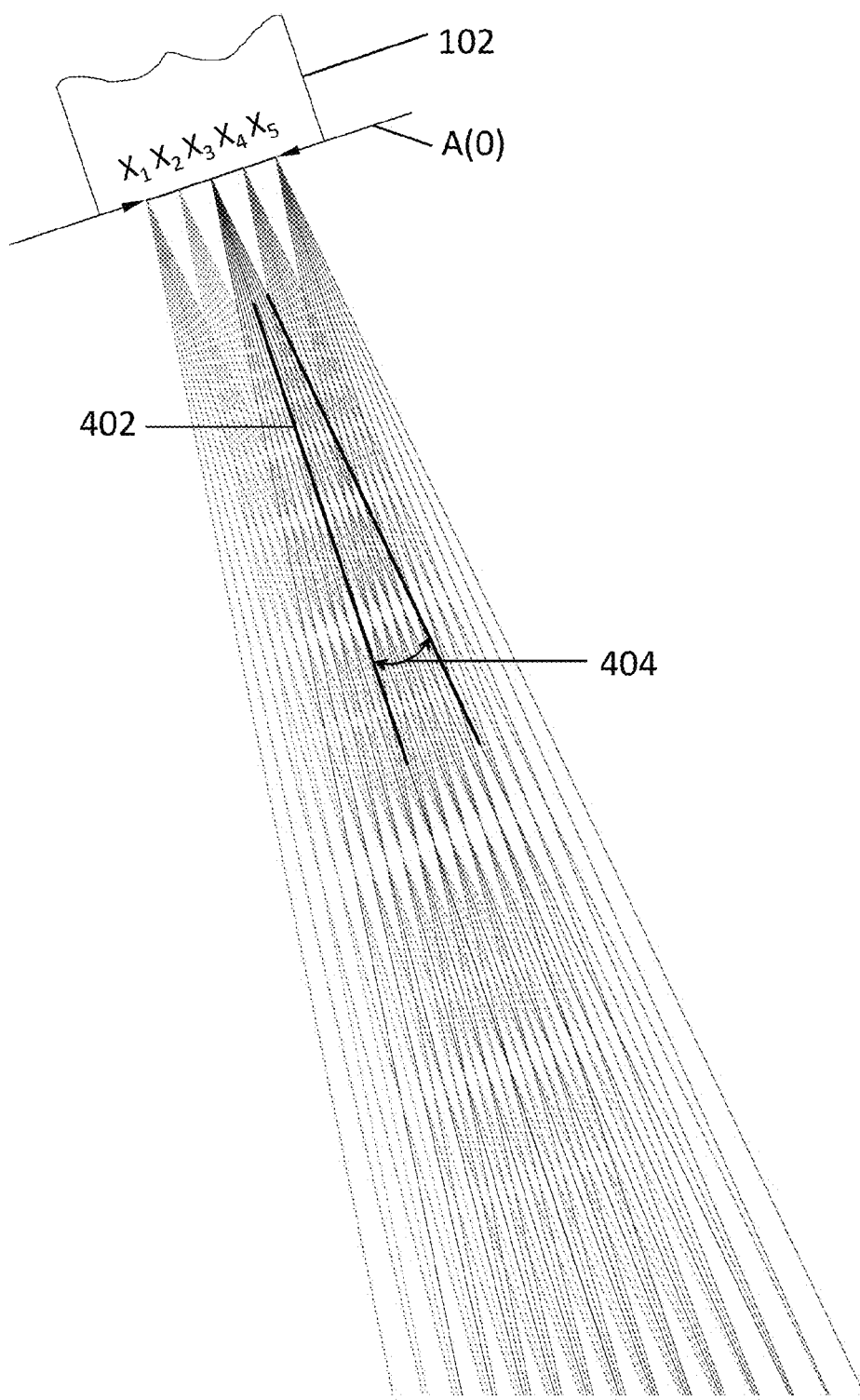
FIG. 4A is a magnified view of fluorescent light exiting at different points over the diameter of the optical fiber.

Referring now to FIG. 4A, the optical fiber 102 used to transport fluorescent light signals captured from the image chamber to the detector array is a multi-mode optical fiber. Light exits the end surface of a multimode fiber from various (if not all) locations over a diameter of the fiber, such as locations X1 through X5 for example. The lenses 303,304 in the input channel shown in FIG. 3, focus light within an aperture A(0) down to a spot A(1) on the first dichroic filter D(1). Because there is a two times (2×) magnification from spot A(0) to spot A(1), the spot size at the aperture A(0) is smaller than the spot size at spot A(1). The different colors for the light rays emanating from the different locations X1 through X5 within the aperture shown in FIG. 4A are for clarity only to show how light at the different positions passes through the detector module. As shown in FIG. 4A, an optical axis 402 extends out from the circular center of the end of the optical fiber 102. Light is launched out the end of the optical fiber 102 at a launch cone angle (CA) 404 with respect to the optical axis 402.

FIG. 3 shows the simulation results of the image array 106B and how light from different locations in the optical beam are alternatively imaged and collimated through the multiple reflections of the mirrors and dichroic filters. While these results show all of the light reflecting, the dichroic filters D(n) at any particular position differ and allow transmission of a light signal (only shown in the last detector channel 313P in FIG. 3) according to their respective passband.

Figure 4B:
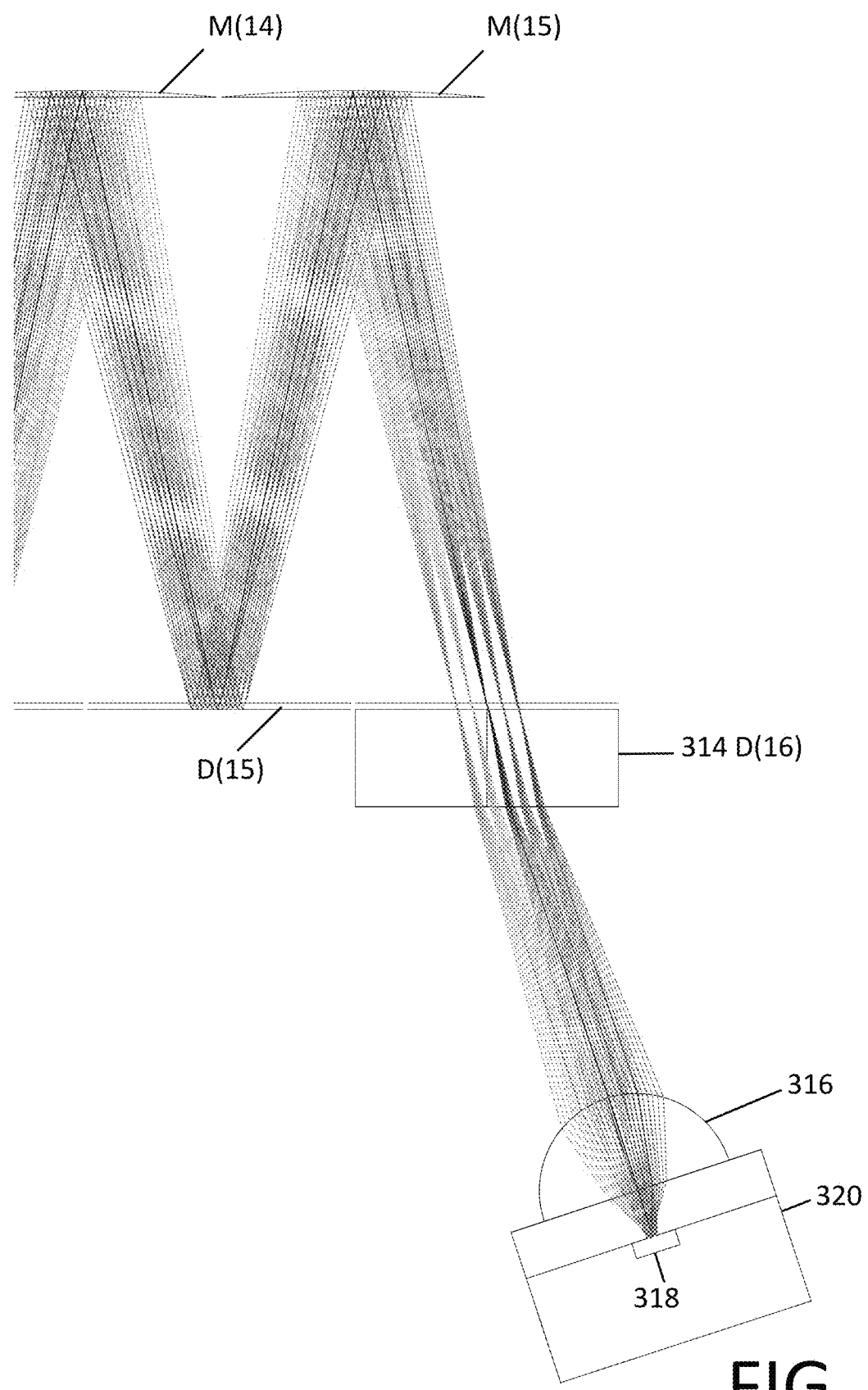
FIG. 4B is a magnified view of a detector to convert optical signals into electrical signals.

Referring now to FIGS. 3 and 4B, in each detector channel 313, the desired wavelength range of the light signal passing through a dichroic filter D(n) can be collected through a lens 316 and detected by a small aperture photosensitive detector 318. A further bandpass filter 314 can alternatively or further be used in each detector channel. Other wavelengths of light at the dichroic filter D(n), if any, are reflected to the next micro-mirror M(n) along the chain or row of micro-mirrors. The row or chain of dichroic filters D(n) de-multiplexes different ranges of light wavelengths into the chain of detector channels 313A-313P.

The magnified view of FIG. 5 shows simulation results of how the optical light beam is alternatively imaged and collimated through the reflection surfaces of the micro-mirrors and dichroic filters. On the odd numbered dichroic filters (e.g., dichroic filters D(7), D(9), and D(11) shown in FIG. 5), the spots are the images of the fiber aperture. That is, the light launched from the fiber aperture is imaged to each filter surface of the odd numbered dichroic filters. On the even numbered dichroic filters (e.g., dichroic filters D(8), D(10), and D(12) shown in FIG. 5), the even numbered spots (e.g., spots A(8), A(10), and A(12) shown in FIG. 5) are in collimating spaces, where light rays emitting from a point at the fiber aperture becomes a collimated beam. The beam directions in the collimating space at each even numbered dichroic filter are slightly different for different points from the fiber aperture.

In a flow cytometer, one or more linear 16-channel compact wavelength detection modules can be used to detect fluorescent signals of light associated with particles. Alternatively or conjunctively, one or more dual 8-channel compact wavelength detection modules can be used in a flow cytometer to detect fluorescent signals of light associated with particles.

Figure 7A:
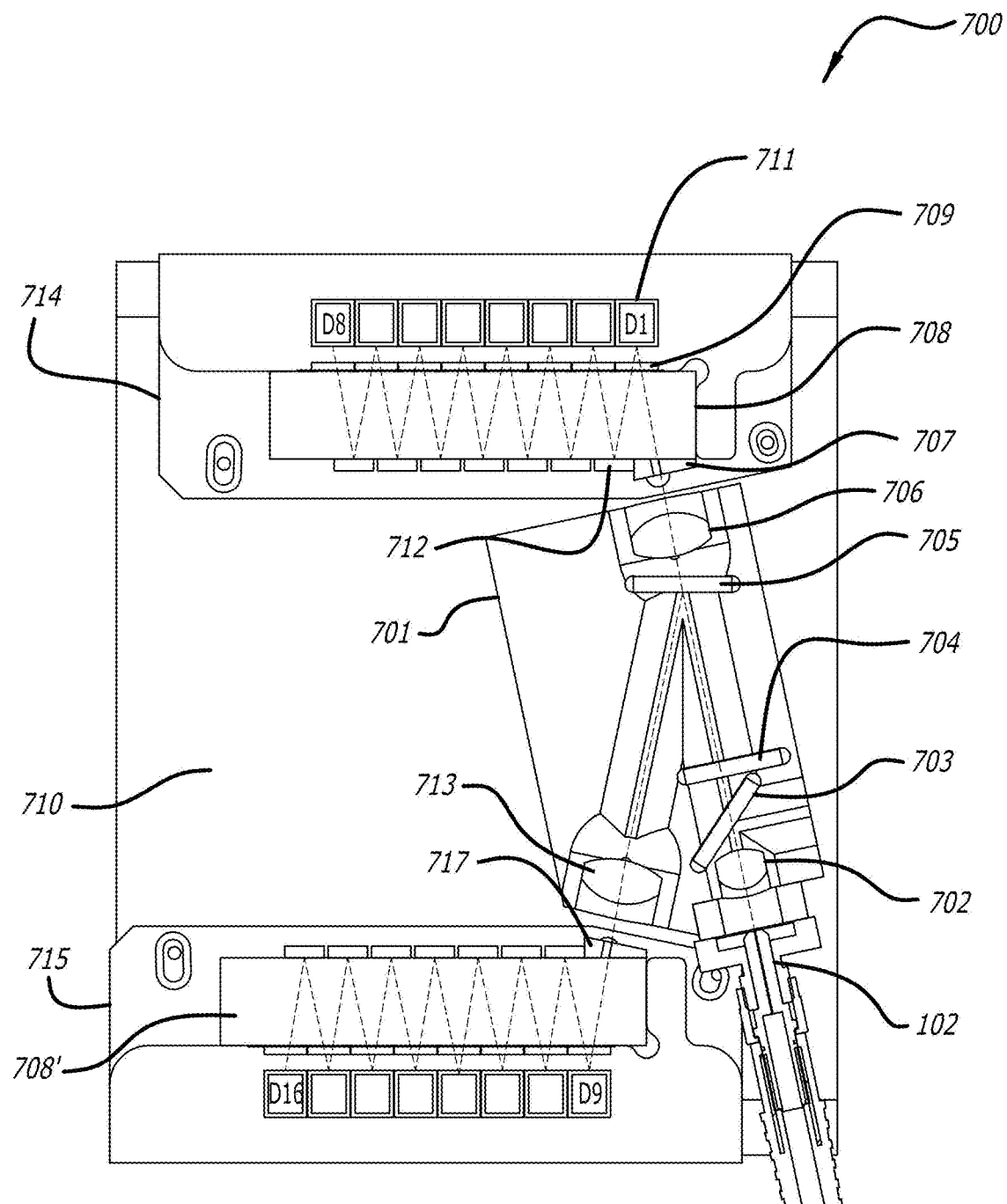
FIGS. 7A-7C are differing diagrammatic views of a detection module in a modular flow cytometer system with a pair of 8 channel 1f image arrays and a pair of 8 detector channels.
Figure 7B:
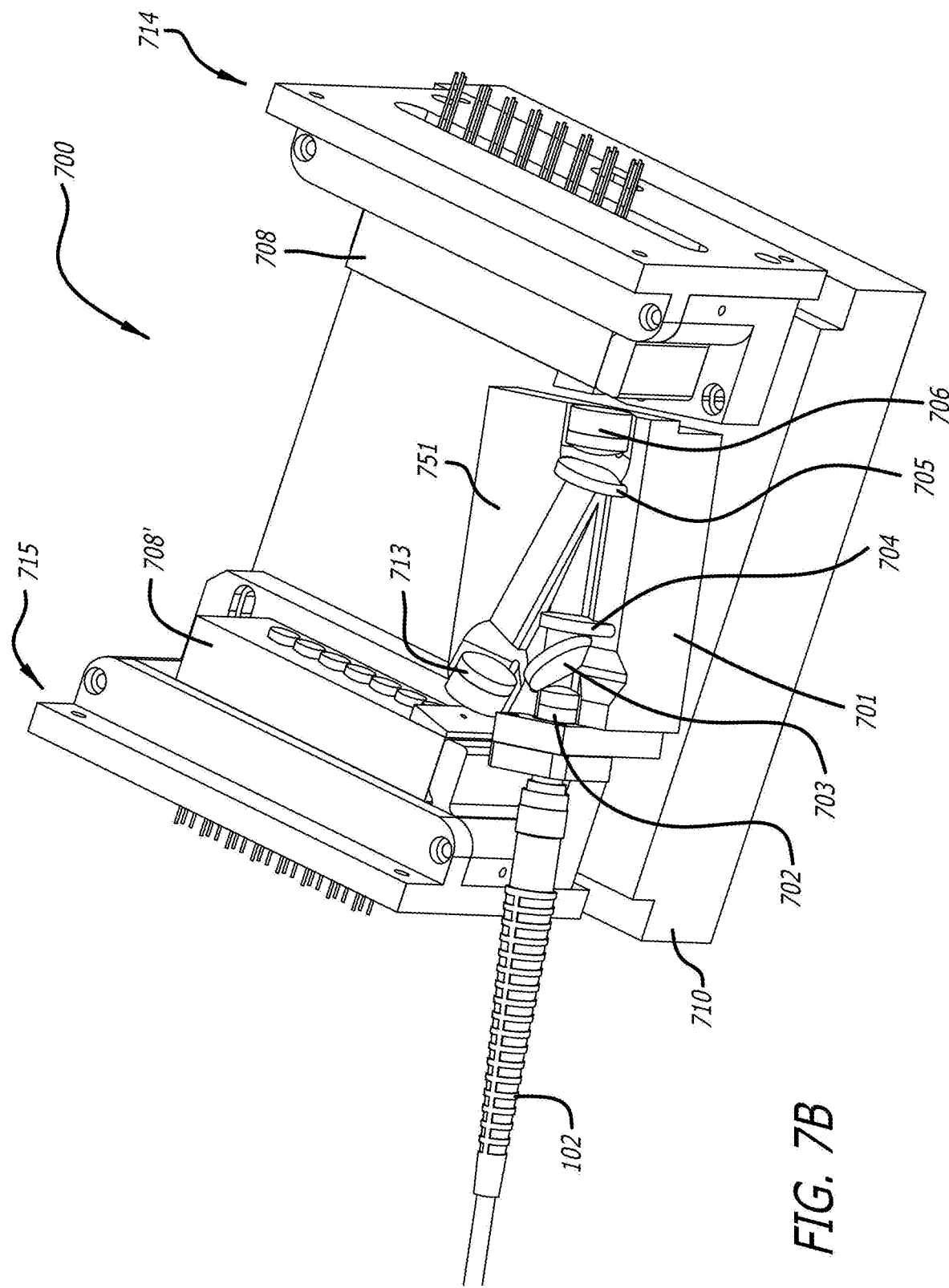
Figure 7C:
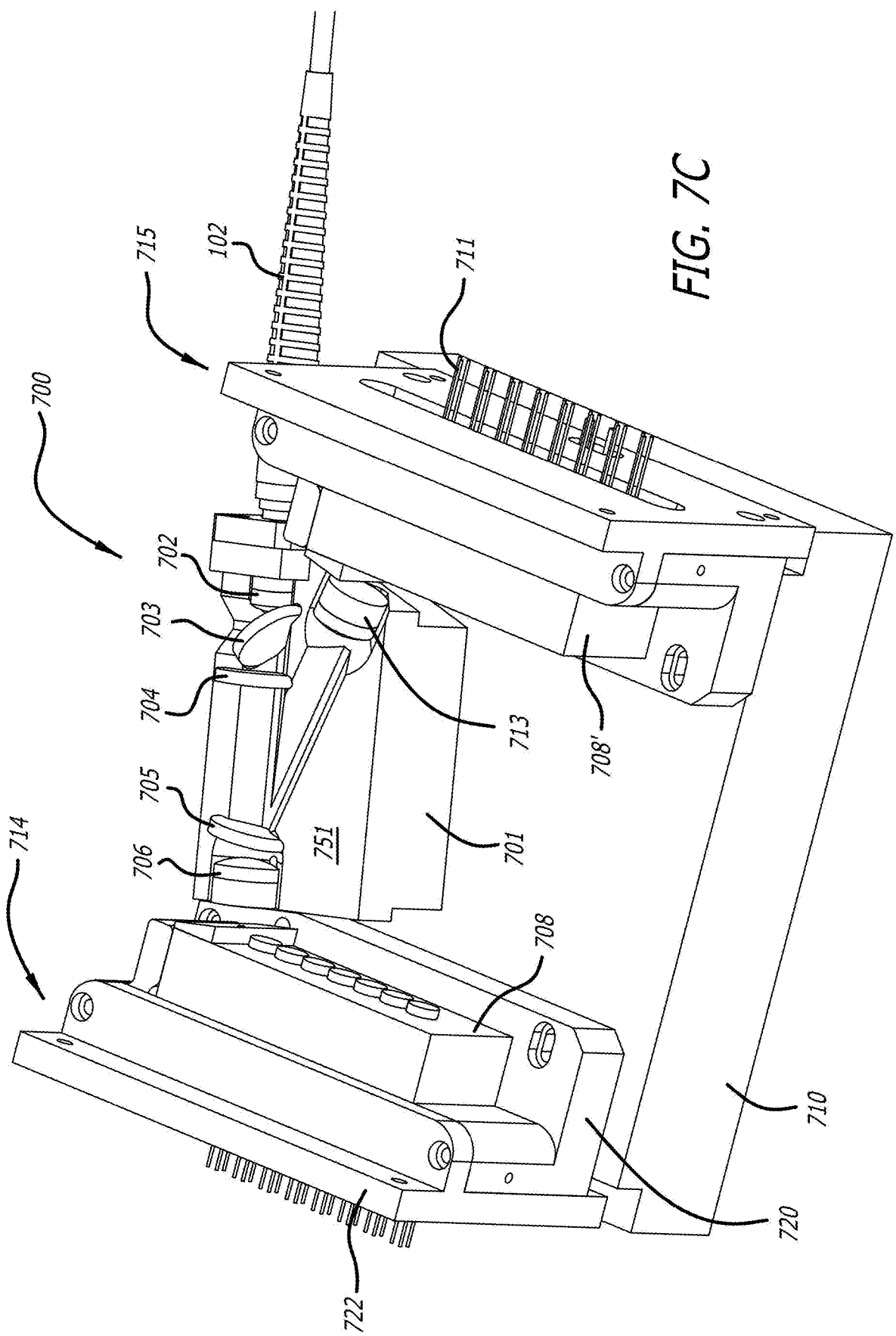

FIGS. 6 and 7A-7C illustrate embodiments of compact wavelength detection modules having the functionality of the 1f image array 106B shown in FIG. 2B. FIG. 6 illustrates a linear 16-channel compact wavelength detection module 600. FIGS. 7A-7C illustrate a dual 8-channel compact wavelength detection module 700.

Referring now to FIG. 6, linear 16-channel compact wavelength detection module 600 includes an input stage (head) 601 and a detection module 614 mounted to a base 610. Light is coupled into the input stage (head) 601 by an optical fiber 102. The input stage (head) 601 includes a collimating lens 602, a long pass filter 603, a cleanup optical blocker 604, and a focusing lens 605 mounted to an optical bench. The input stage (head) 601 sets up the magnification m of the initial spot size image A(1) on the first dichroic filter.

From the input stage 601, the light is coupled into a detection module 614. An end of the input stage (head) 601 is coupled to a transparent wedge 607 to receive the light from the focusing lens 605. The input stage (head) 601 and the detection module 614 are coupled to a chassis or base 610 of the flow cytometer to maintain their alignment together.

The detection module 614 includes a 1f image array 608 and a detector/lens array 611. The image array 608 is an embodiment of the image array 106B of FIGS. 2B and 5. The image array 608 includes a transparent block 680 (e.g., see blocks 806,1006 of FIGS. 8 and 10) including the wedge 607 and fifteen micro-mirrors 612 on one side. On an opposing side of the transparent block 680, there are sixteen dichroic filters 609. The detector/lens array 611, an embodiment of the plurality of detectors 313A-313P, includes a plurality of photodetectors D1 through D16 (e.g., detector 318 of FIG. 3) each having a lens (e.g., lens 316 of FIG. 3) to focus the demultiplexed light into the photodetector.

The light that is coupled into the image array 608 by the input stage 601, is wavelength demultiplexed into the detectors D1 through D16 of the detector/lens array 611. The 16-channel detection module analyzes a range of wavelengths (e.g., 400 nm to 800 nm wavelengths).

To provide a different footprint that better fits a test bench and provide parallel processing, the linear 16-channel compact wavelength detection module 600 can be instead implemented as a dual 8-channel compact wavelength detection module.

Referring now to FIG. 7A, a top view of a dual detection module 700 is shown with a pair of 8-channel compact wavelength detection modules 714,715. The compact wavelength detection module 700 includes an input stage (head) 701 in communication with the first 8-channel detection module 714 and the second 8-channel detection module 715 all of which are mounted in alignment to a base 710. The first 8-channel detection module 714 de-multiplexes and analyzes in parallel a first range of wavelengths (e.g., 650 nm to 800 nm—red wavelengths). The second 8-channel detection module 715 de-multiplexes and analyzes in parallel a second range of wavelengths (e.g., 400 nm to 650 nm—blue wavelengths).

The light launched from the optical fiber 102 is coupled into the input stage (head) 701. The light from the fiber 102 passes through a collimating lens 702 into a long pass dichroic filter 703. The long pass dichroic filter 703 reflects light at the laser excitation wavelength (e.g., less than 400 nm) at a 45-degree angle to a scatter detector (not shown). The side scatter (SSC) light can be focused onto a small aperture detector with a ball lens similar to that described for the fluorescent light. Fluorescent light in the fluorescent light spectrum (e.g., 400 nm-800 nm) passes through the long pass filter 703 and into a second cleanup filter 704. The cleanup filter 704 ensures that no excitation laser light reaches the de-multiplexing detection modules 714-715.

After the cleanup filter 704, the fluorescent light is separated into a long-wavelength band and a short-wavelength band by a long pass filter 705. The long-wavelength light (e.g., red—650 nm to 800 nm) passes through the long-pass filter 705 and is focused into the first detection module 714 by a collimating/focusing lens 706. The long wavelength portion of light that passes that is focused by focusing lens 706 is de-multiplexed by the first detection module 714. The short-wavelength light band (e.g., blue—400 nm to 650 nm) is reflected by the long pass filter 705 back at an angle into a collimating/focusing lens 713. The collimating/focusing lens 713 focuses the short wavelength band of light into the second detection module 715. The short wavelength portion reflected by long-pass filter 705 is de-multiplexed by the second detection module 715. Alternatively, the filter 705 can be a short-pass filter and the short wavelength light passes through the filter and is de-multiplexed by the first detection module 714 while long wavelength light is reflected by the filter and is de-multiplexed by the second detection module 715.

Referring to the first detection module 714, light from the focusing lens 706 enters normal to a 12-degree wedge face 707, and passes through the transparent block (e.g., block 806 of FIG. 8) of the image array 708, before imaging onto the first dichroic or bandpass filter 709. Light passes through the bandpass filter 709 and is focused onto a first small area detector D1 in the detector/lens array 711. The light rejected by the bandpass filter 709 is reflected back onto a first micro-mirror M(1) 712 of a plurality of micro-mirrors M(1) through M(7) in the image array. The first micro-mirror M(1) 712 collimates and reflects the light back onto a second detection module D2 and so on and so forth down the serial chain of micro-mirrors and detection modules of the transparent block of image array 708. The second detection module 715 functions similarly to the first detection module 714.

Reflections progress through the image array 106B,708, 708' in each of the first detection module 714 and the second detection module 715 as described herein, alternately focusing and collimating the light with successively shorter band-passes of light through the dichroic filters into odd and even detectors 118, respectively in the odd and even detector channels. Accordingly, different wavelengths are de-multiplexed by the plurality of detectors in each of the first detection module 714 and second detection module 715.

For a given fluorescent event, signals from each detector (e.g., detector 318 shown in FIG. 4B, lens/detector D1 through D16 in FIGS. 6-7) is amplified, digitized and synchronized by an electronics system to provide a spectral representation of the input fluorescent light signal. Integration of the detection electronics into the optical module assembly allows compact design and lower noise by minimizing the coupling length of detector and amplification circuit. The detector 318 shown in FIG. 4B converts an optical signal, such as the input fluorescent light signal, into an electrical signal.

FIGS. 7B and 7C respectively illustrate right and left perspective views of the dual detection module 700 with the pair of 8-channel compact wavelength detection modules 714,715. Each of the detection modules 714,715 includes a mounting base 720 and a cover 722 to enclose a mounting block 1200 (see FIG. 12) to which the lens/detectors 711 in the detector array or chain is mounted. The mounting base 720 and cover 722 keeps the elements of the image array 708,708' in the transparent block 806,1006 aligned together with the detector array in each detector module 714,715. The mounting base 720 of each detection module 714,715 is coupled to the base 710 by a plurality of fasteners.

The input stage 701 includes an optical bench 751 with a plurality of filter slots to receive filters 703-705; a plurality of lens slots to receive lenses 702,706,713; and one or more light channels along which light is reflected and propagates through the filters and lenses. The optical bench 751 is coupled to the base 710 of the detection module 700 to maintain alignment with the detection modules 714-715.

Figure 13:
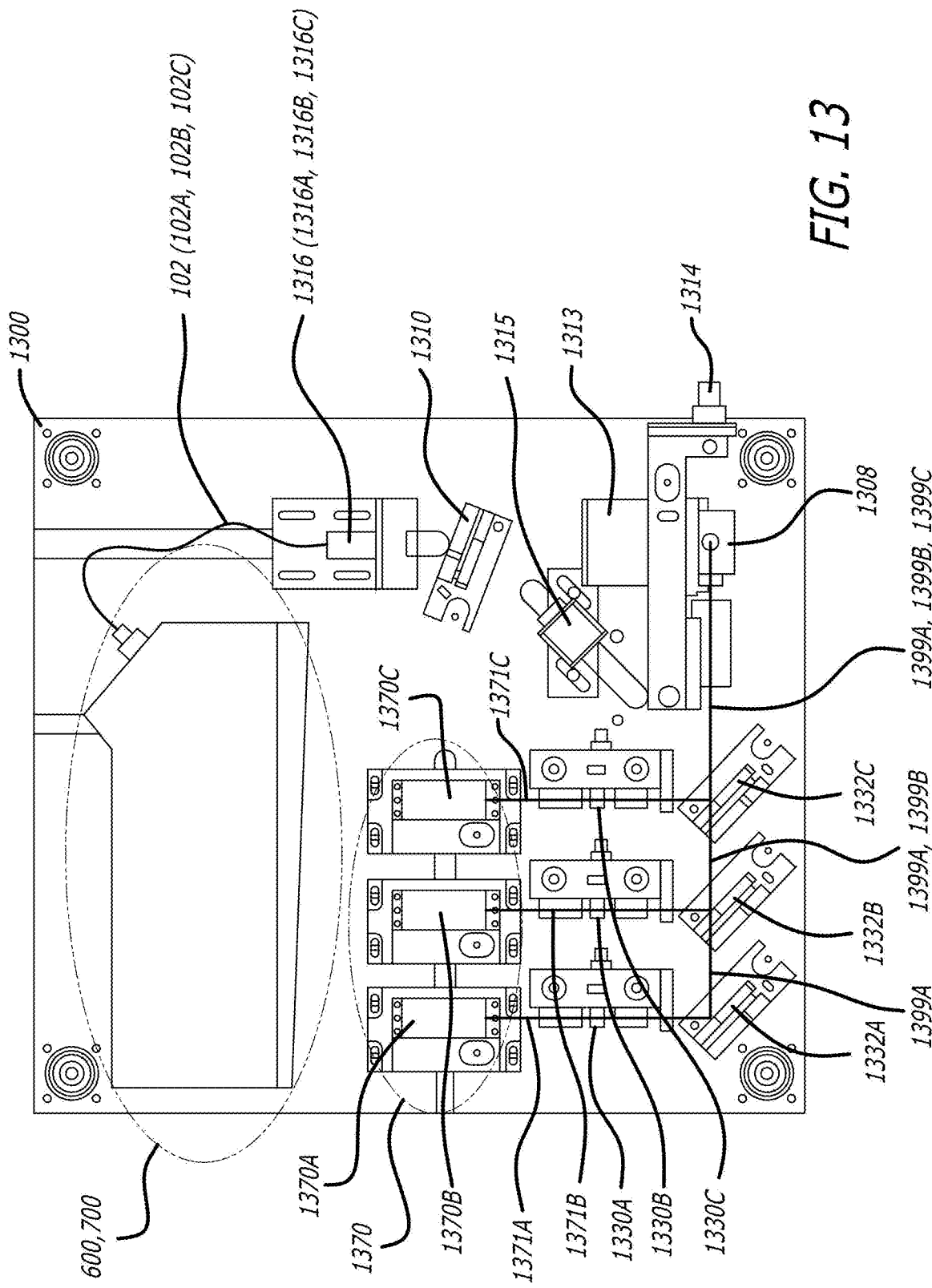
FIG. 13 is a top view of an optical plate assembly in a modular flow cytometry system.

Referring now to FIG. 13, a top view of an optical plate assembly 1300 in a modular flow cytometry system is shown. The optical plate assembly 1300 includes a laser system 1370 having three semiconductor lasers 1370A, 1370B,1370C that direct excitation into a flow cell assembly 1308 where a sample fluid flows with sample particles. The laser system 1370 attempts to direct the multiple (e.g., three) laser beams in a co-linear manner toward the flow cell assembly 1308. However, the multiple laser beams can be slightly offset from one another. The laser system 1370 includes semiconductor lasers 1370A,1370B,1370C having wavelengths typically at about 405 nanometers (nm), 488 nm, and 640 nm. The output power of the 405 nm semiconductor laser is usually larger than 30 milliwatts (mW); the output power of the 488 nm semiconductor laser is usually greater than 20 mW; and the output power of the 640 nm semiconductor laser is usually greater than 20 mW. Controller electronics control the semiconductor lasers to operate at a constant temperature and a constant output power.

An optical system spatially manipulates the optical laser beams 1371A,1371B,1371C generated by the semiconductor lasers 1370A,1370B,1370C respectively. The optical system includes lenses, prisms, and steering mirrors to focus the optical laser beams onto a fluidic stream carrying biological cells (bio cells). The focused optical laser beam size is typically focused for 50-80 microns (μm) across the flow stream and typically focused for 5-20 μm along the stream flow in the flow cell assembly 1308. In FIG. 13, the optical system includes beam shapers 1330A-1330C that receive the laser light 1371A,1371B,1371C from the semiconductor lases 1370A-1370C, respectively. The laser light output from the beam shapers 1330A-1330C are coupled into mirrors 1332A-1332C respectively to direct the laser light 1399A,1399B,1399C towards and into the flow cell assembly 1308 to target particles (e.g. biological cells) stained with a dye of flourochromes. The laser light 1399A,1399B, 1399C is slightly separated from each other but directly substantially in parallel by the mirrors 1332A-1332C into the flow cell assembly 1308.

The laser light beams 1399A,1399B,1399C arrive at the biological cells (particles) in the flow stream in the flow cell assembly 1308. The laser light beams 1399A,1399B,1399C are then scattered by the cells in the flow stream causing the flourochromes to fluoresce and generate fluorescent light. A forward scatter diode 1314 gathers on-axis scattered light. A collection lens 1313 gathers the off-axis scattered light and the fluorescent light and directs them together to a dichromatic mirror 1310. The dichromatic mirror 1310 focuses the off-axis scattering light onto a side scatter diode 1315. The dichromatic mirror 1310 focuses the fluorescent light onto at least one fiber head 1316. At least one fiber assembly 102 routes the fluorescent light toward at least one detector module 600,700.

For a more detailed analysis of a biological sample using different fluorescent dyes and lasers wavelengths, multiple fiber heads 1316, multiple fiber assemblies 102, and multiple detector modules 600,700 can be used. Three fiber heads 1316A,1316B,1316C can be situated in parallel to receive the fluorescent light and three fiber assemblies 102A,102B, 102C can be used to direct the fluorescent light to three detector modules 600A,600B,600C or 700A,700B,700C.

The three fiber heads 1316A,1316B,1316C (and three fiber assemblies 102A,102B,102C) are enabled because the three laser light beams 599A,599B,599C are slightly offset (e.g., not precisely co-linear). Accordingly, three fiber heads 1316A,1316B,1316C can collect light beam data separately from the three laser light beams 599A,599B,599C, which have three different wavelengths. The three fiber assemblies 102A,102B,102C then direct light into three different detector modules (e.g., three different detector modules 600A, 600B,600C or 700A,700B,700C).

Alternatively, the modular flow cytometry system can use one detector module 600,700 to collect the light beam data. For example, the three fiber assemblies 102A,102B,102C can direct light into one detector module 600,700, as opposed to three different detector modules. Separation of the light beam data is then handled as data processing operations, instead of separating the light beam data by using three different detector modules. Using one detector module may be less complex from a physical device standpoint. However, the data processing operations can be more complex because separation of the light beam data requires more data manipulation (e.g., identifying different wavelengths and separating light beam data accordingly).

Cell geometric characteristics can be categorized though analysis of the forward and side scattering data. The cells in the fluidic flow are labeled by dyes of visible wavelengths ranging from 400 nm to 900 nm. When excited by the lasers, the dyes produce fluorescent lights, which are collected by a fiber assembly 102 and routed toward a detector module 600,700. The modular flow cytometry system maintains a relatively small size for the optical plate assembly via compact semiconductor lasers, an 11.5× power collection lens 1313, and the compact image array in the detector modules 600,700.

The collection lens 1313 contributes to the design of the detector modules 600,700. The collection lens 1313 has a short focal length for the 11.5× power. The collection lens 1313, an objective lens, has a high numerical aperture (NA) of about 1.3 facing the fluorescence emissions to capture more photons in the fluorescence emissions over a wide range of incident angles. The collection lens 1313 has a low NA of about 0.12 facing the collection fiber 102 to launch the fluorescent light into the fiber over a narrow cone angle. Accordingly, the collection lens 1313 converts from a high NA on one side to a low NA on the opposite side to support the magnification m in the input channel of the detector module 600,700.

The diameter of the core of the collection fiber assembly 517 is between about 400 μm and 800 μm, and the fiber NA is about 0.12 for a core diameter of about 600 μm. The fiber output end can be tapered to a core diameter of between about 100 μm and 300 μm for controlling the imaging size onto the receiving photodiode.

The input end of the collection fiber 102 can also include a lensed fiber end to increase the collection NA for allowing use of a fiber core diameter that is less than about 400 μm. Because the fiber 102 has the flexibility to deliver the light anywhere in the flow cytometer system, the use of fiber for fluorescence light collection enables optimization of the location of the receiver assembly and electronics for a compact flow cytometer system.

To manufacture a low cost flow cytometer, lower cost components can be introduced. The image array 106B in each detection module 614,714,715 is formed out of a solid transparent material to provide detection module that is reliable, low cost, and compact. Furthermore, the flow cytometer uses low cost off the shelf thin outline (TO) can detectors.

Figure 12:
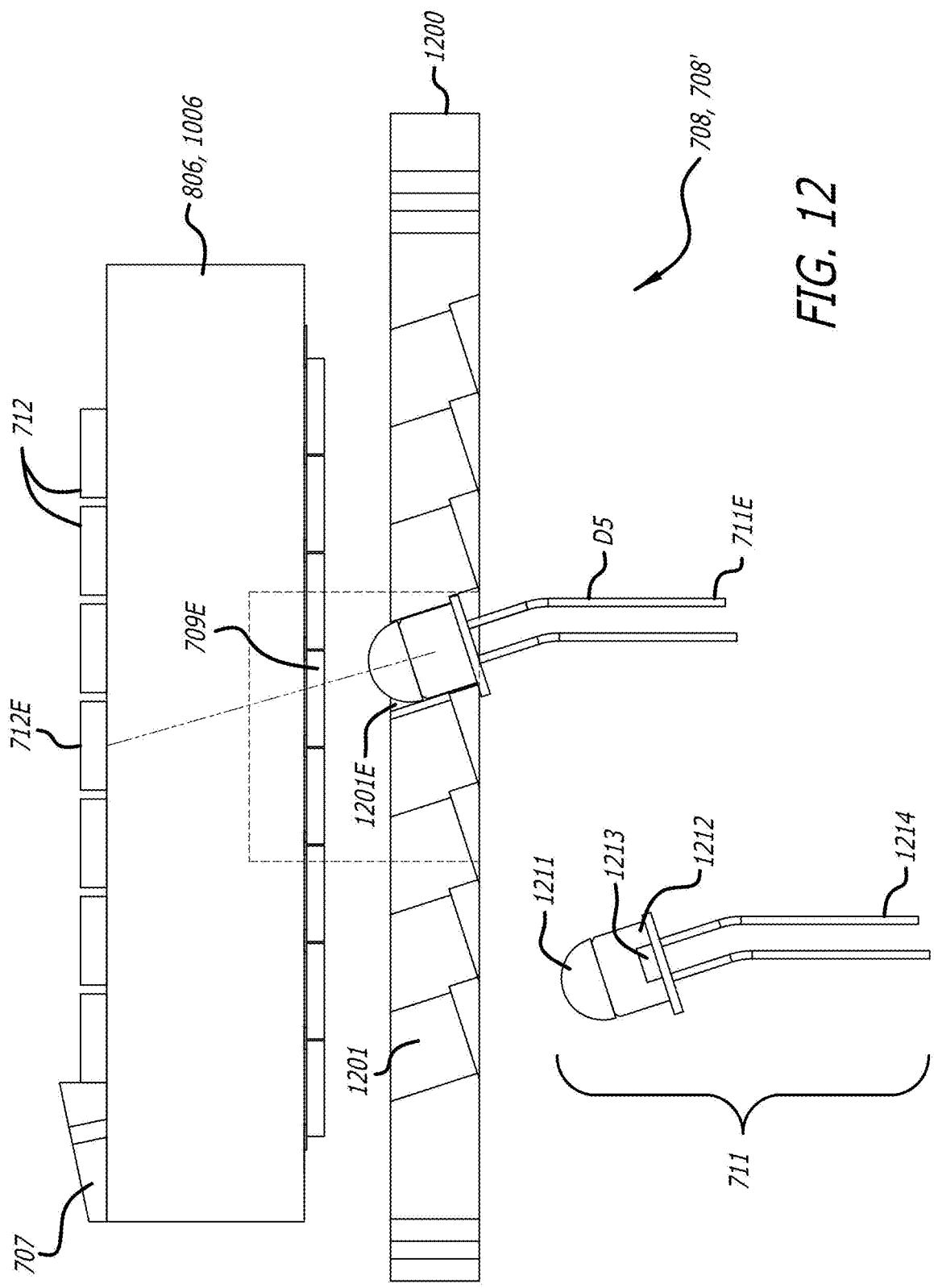
FIG. 12 is a perspective view of a mounting block adjacent imaging block and a low cost thin outline detector that is used in the detector modules of FIG. 6 and FIGS. 7A-7C.

Referring now to FIG. 12, a mounting block 1200 is shown adjacent the transparent block 806,1006 (see FIGS. 8-11) that are coupled together to form the 1f image array 708,708' that is to be mounted by the mounting base 720 and cover 722 to the base 710 of the compact detector module 700 shown in FIGS. 7A-7C. The mounting block 1200 includes a plurality of angled curved openings 1201 to receive a plurality of TO can lens/detectors 711. The alignment of the mounting block 1200 with the transparent block 806,1006 of the imaging array 708 and the angle of the angled curved openings 1201 is such that light reflected off a micro-mirror 712E can be bandpass filtered by a dichroic filter 709E and coupled into a lens/detector 711E.

Each TO can lens/detector 711 of the plurality includes a focusing lens 1211 and a low cost TO can detector 1212 coupled together. The TO can detector 1212 includes a window top and a semiconductor photodetector 1213 inside the TO can package. The semiconductor photodetector 1213 is electrically coupled to a plurality of electrical pins 1214 that extend outside the TO can package to which the other electronics of the flow cytometer electrically couple. Like the detector 318 shown in FIG. 4B, the semiconductor photodetector 1213 converts an optical signal, such as the input fluorescent light signal, into an electrical signal on at least one electrical pin 1214.

Referring now to FIG. 8, a perspective view of a transparent block 806 formed out of a solid transparent material 800 is shown for an embodiment of the 1f image array 106B,608,708,708'. The solid transparent material 800 used for the transparent block 806 can be clear glass or clear plastic, for example. A plurality of micro-mirrors 810 in a row and serial chain is formed into or on one side of the transparent block 806 of transparent material 800. A plurality of dichroic or bandpass filters 812 in a row and serial chain are formed into or on an opposing side of the transparent block 806 of transparent material 800. Each dichroic or bandpass filter 812 is tuned to a different range of wavelengths of light to allow detection of a broad range of fluorescent light being emitted by flourochromes. In one embodiment, the plurality of micro-mirrors 810 are concave spherical mirrors.

The transparent block 806 formed out of the solid transparent material 800 further includes a 12-degree wedge face 820 to receive light from a focusing lens, such as described with the 1f imaging array 708. The light enters normal to the surface of the wedge face 820 and is directed (bent) towards the first dichroic or bandpass filter D(1). The light passes through the transparent block 806 to reach the first dichroic or bandpass filter D(1).

Referring now to FIG. 10, a perspective view of a transparent block 1006 is shown formed out of the solid transparent material 800 for another embodiment of the 1f image array 106B,608,708,708'. The solid transparent material 800 used for the transparent block 1006 can be clear glass or clear plastic, for example. A plurality of micro-mirrors 1010 are concave rectangular mirrors formed into a side of the transparent material. A plurality of dichroic or bandpass filters 1012 are formed into or on an opposing side of the transparent material 800. Each dichroic or bandpass filter 812 is tuned to a different range of wavelengths of light to allow detection of a broad range of fluorescent light being emitted by flourochromes.

The solid transparent material 800 further includes a 12-degree wedge face 820 to receive light from a focusing lens, such as described with the image array 708. The light enters normal to the surface of the wedge face 820 and directed (bent) towards the first dichroic or bandpass filter D(1). The light passes through the block to reach the first dichroic or bandpass filter D(1).

Referring now to FIG. 9A, a cross section view illustrates the distance (e.g., thickness L) between the spherical micro-mirror 810 on one side and the opposite side of the transparent block 806. An axis 814 perpendicular to the transparent block at the center of the spherical micro-mirror 810 extends out to the opposite side of the transparent block 806. FIG. 9B illustrates an axis 815 perpendicular to the transparent block at the center of the dichroic or bandpass filter 812. The axis 815 extends out to the opposite side of the transparent block 806 of transparent material 800. The axes 814 and 815 are parallel to each other.

A reflective material 811 is formed (e.g., disposed) on a spherical transparent micro-lens shape of the solid transparent material 800 to form each spherical micro-mirror 810 in one side of the transparent block 806. The dichroic or bandpass filter 812 is coupled to the material 800 in an opposite side of the transparent block 806.

FIG. 11 similarly shows the distance and the axis 1014 between the concave rectangular micro-mirror 1010 on one side and the opposite side of the transparent material 800 forming the transparent block 1006. FIG. 11 further illustrates an axis 1015 perpendicular at a center point of the dichroic or bandpass filter 1012. The optical axis 1015 extends out to the opposite side of the transparent block 1006 formed by the transparent material 800. The optical axes 1014 and 1015 are parallel to each other.

FIG. 11 further shows a reflective material 1011 is formed (e.g., disposed) on a curved transparent rectangular shape of the solid transparent block 1006 formed out of the transparent material 800 to form the rectangular micro-mirror 1010. The dichroic or bandpass filter 1012 is coupled to an opposite side of the solid transparent block 1006.

The fluorescence dyes used in flow cytometry applications covers the entire visible and near infrared wavelength range. The emission wavelength bandwidth is typically large for long wavelength fluorochromes. Each of the dichroic or bandpass filters 812 can have their detector filter passbands and center wavelength optimized to measure different dyes with the same amount of spectral sampling. Furthermore, individual filter optimization allows exclusion of excitation wavelengths from other lasers. In this way, the detector in each channel can be utilized fully to detect the signal of interest. In conjunction with a fluorescence spectral unmixing algorithm executed by a processor of a computer, the individual and optimized passband detection provides the ultimate detection of a large number of fluorescent dyes of interest.

Methods

Methods of using the various detection systems disclosed herein in a flow cytometer are now described. Before launching the fluorescent light generated by flourochromes excited by laser light out of the end of the optical fiber 102 shown in the figures, the fluorescent light of different wavelengths is generated by various flourochromes marking different particles in a sample in a flow channel that are excited by laser light. The fluorescent light that is generated is received by a collection lens near the opposite end of the laser as can be seen in FIG. 13. A converter is used to convert from a first numeric aperture on the capture side to a second numeric aperture less than the first numeric aperture to better match the numeric aperture of the optical fiber. The optical fiber then directs the fluorescent light towards the end of the optical fiber to flexibly direct it towards the compact detection module 600,700.

The optical fiber 102 couples the fluorescent light into the end of the optical fiber thereby launching it out from the optical fiber. The launched fluorescent light has different wavelengths generated by the different flourochromes attached to different particles in the sample fluid that have been excited by laser light.

In an input channel, the light launched from the end of the optical fiber is collimated and focused by a lens towards the first dichroic filter of a first plurality of dichroic filters in a first de-multiplexing imaging array.

Further along the input channel, the laser light used to excite the different flourochromes that is launched from the optical fiber is blocked from interfering with detecting the wavelengths of fluorescent light by a blocking device.

Further along the input channel, an image size from an end of the optical fiber is magnified to a spot size for a first dichroic filter in a serial chain or row of the first plurality of dichroic filters in the first de-multiplexing imaging array.

In the first de-multiplexing imaging array, a first wavelength range of the fluorescent light is alternatively reflected between the first plurality of dichroic filters and a serial chain or row of a first plurality of micro-mirrors to collimate the fluorescent light on odd numbered dichroic filters and re-image the fluorescent light on even numbered dichroic filters. A focal length of the first plurality of micro-mirrors and a distance of separation between the first plurality of dichroic filters and the first plurality of micro-mirrors provides a telescopic effect along the chain of micro-mirrors to collimate the fluorescent light on the odd numbered dichroic filters and re-image the fluorescent light on the even numbered dichroic filters.

In the serial chain or row of the first plurality of dichroic filters, different wavelength ranges of the first wavelength range of the fluorescent light is band passed at each to de-multiplex the wavelength spectrum of the first wavelength range of the fluorescent light.

Adjacent the serial chain or row of the first plurality of dichroic filters is a serial chain or row of plurality of detector channels as shown in FIGS. 3, 6, and 7A-7C with a first plurality of first detectors. Each detector channel has a lens to focus the different wavelength ranges of the fluorescent light into a first plurality of light detectors.

The serial chain or row of plurality of detectors detects the fluorescent light in each of the different wavelength ranges of the first wavelength range associated with each flourochrome tagged to a particle. The plurality of light detectors convert the fluorescent light received by each into an electrical signal that can be analyzed and counted.

With the fluorescent light converted into an electrical signal by the detectors, a computer with a processor can then be used to count a number of each of the different particles in the sample fluid such as disclosed in application Ser. No. 15/498,397 titled COMPACT MULTI-COLOR FLOW CYTOMETER filed on Apr. 26, 2017 by David Vrane et al., incorporated herein by reference.

A second and/or third de-multiplexing imaging array may be used in parallel with the first de-multiplexing imaging array. In this case, the methods further include splitting the fluorescent light into the first wavelength range of the fluorescent light for the first de-multiplexing imaging array, a second wavelength range of the fluorescent light for the second de-multiplexing imaging array, and/or a third wavelength range of the fluorescent light for the third de-multiplexing imaging array. Such as shown in FIG. 13, a first optical fiber 102A may be used to direct fluorescent light towards the first de-multiplexing imaging array. A second optical fiber 102B may be used to direct fluorescent light towards the second de-multiplexing imaging array. A third optical fiber 102B may be used to direct fluorescent light towards the third de-multiplexing imaging array.

The steps described herein for the first de-multiplexing imaging array may be concurrently performed by the second and/or third de-multiplexing imaging arrays so different additional ranges of wavelengths may be analyzed. For brevity, the repeated steps are not repeated but incorporated here by reference.

CONCLUSION

The embodiments are thus described. While embodiments have been particularly described, they should not be construed as limited by such embodiments, but rather construed according to the claims that follow below.

While certain exemplary embodiments have been described and shown in the accompanying drawings, it is to be understood that such embodiments are merely illustrative of and not restrictive on the broad invention, and that the embodiments not be limited to the specific constructions and arrangements shown and described, since various other modifications may occur to those ordinarily skilled in the art.

Certain functions of a flow cytometer can be implemented in software and executed by a computer or processor, such as the analysis of the electrical signals detected by the detectors to count different particles in a sample fluid. The program or code segments of the software are used to perform the necessary tasks to perform those functions. The program or code segments can be stored in a processor readable medium or transmitted by a computer data signal embodied in a carrier wave over a transmission medium or communication link. The processor readable medium can include any storage medium that can store information. Examples of the processor readable medium include an electronic circuit, a semiconductor memory device, a read only memory (ROM), a flash memory, an erasable programmable read only memory (EPROM), a floppy diskette, a CD-ROM, an optical disk, and a hard disk. The code segments can be downloaded via computer networks such as the Internet, Intranet, etc. to the storage medium.

While this specification includes many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations, separately or in sub-combination. Moreover, although features can be described above as acting in certain combinations and even initially claimed as such, one or more features from a claimed combination can in some cases be excised from the combination, and the claimed combination can be directed to a sub-combination or variations of a sub-combination. Accordingly, the claimed invention is limited only by patented claims that follow below.

What is claimed is:

1. A flow cytometer comprising:
a light detection module including
a first image array having
a transparent block,
a plurality of micro-mirrors in a row coupled to a first side of the transparent block, and
a plurality of filters in a row coupled to a second side of the transparent block opposite the first side,
wherein each of the plurality of filters reflects light to one of the plurality of micro-mirrors and passes light of a differing wavelength range and each of the plurality of micro-mirrors reflects light to one of the plurality of filters, such that incident light into the image array zigzags back and forth between consecutive filters of the plurality of filters and consecutive micro-mirrors of the plurality of micro-mirrors,
wherein a radius of curvature of each of the plurality of micro-mirrors directs light onto even filters and reimages light onto odd filters of the plurality of filters along the row; and;
a first plurality of detector channels in a row forming a first detector chain adjacent the first image array, the first plurality of detector channels respectively in light communication with the plurality of filters of the first image array, wherein each detector channel includes a focusing lens, and a photo detector.

2. The flow cytometer of claim 1, wherein the light detection module further includes
an input channel that images from an aperture at a fiber to a surface of a first filter of the first plurality of filters; and
the flow cytometer further comprises
a collection lens with a first side facing a sample chamber and an opposing second side, the first side of the collection lens having a first numeric aperture (NA) and the second side of the collection lens having a second NA less than the first NA; and
an optical fiber with a first end aligned with an optical axis of the collection lens and a second end aligned with an optical axis of the input channel of the detection module, the optical fiber having a fiber NA greater than or equal to the second NA of the collection lens.

3. The flow cytometer of claim 2, wherein the input channel magnifies the size of the input image size from the aperture to the surface of the first filter.

4. The flow cytometer of claim 2, wherein the input channel includes a collimating lens to receive launched fluorescent light and collimate the light, a blocking filter to reject a laser light used to stimulate fluorochromes in the collimated light, and a focusing lens to focus the collimated light from the collimating lens onto the first filter.

5. The flow cytometer of claim 1, wherein the light detection module further includes
a second image array having
a transparent block,
a plurality of micro-mirrors in a row coupled to a first side of the transparent block, and
a plurality of filters in a row coupled to a second side of the transparent block opposite the first side.

6. The flow cytometer of claim 5, wherein the light detection module further includes
a second plurality of detector channels in a row forming a second detector chain adjacent the second image array, the second plurality of detector channels respectively in light communication with the plurality of filters of the second image array, wherein each detector channel includes a focusing lens, and a photo detector.

7. The flow cytometer of claim 6, wherein the light detection module further includes
an input channel that couples an input image from an aperture at a fiber to a surface of a first filter of the first plurality of filters and a surface of a first filter of the second plurality of filters; and
the flow cytometer further comprises
a collection lens with a first side facing a sample chamber and an opposing second side, the first side of the collection lens having a first numeric aperture (NA) and the second side of the collection lens having a second NA less than the first NA; and
an optical fiber with a first end aligned with an optical axis of the collection lens and a second end aligned with an optical axis of the input channel of the detection module, the optical fiber having a fiber NA greater than or equal to the second NA of the collection lens.

8. The flow cytometer of claim 7, wherein the input channel magnifies the size of the input image size from the aperture to the surface of the first filter of each of the first and second plurality of filters.

9. The flow cytometer of claim 7, wherein the input channel includes
a collimating lens to receive launched fluorescent light and collimate the light,
a blocking filter to reject a laser light used to stimulate fluorochromes in the collimated light,
a beam splitter to split the collimated light into a first range of wavelengths and a second range of wavelengths different from the first range,
a first focusing lens to focus the collimated light with the first range of wavelengths onto the first filter of the first plurality of filters, and
a second focusing lens to focus the collimated light with the second range of wavelengths onto the first filter of the second plurality of filters.

10. The flow cytometer of claim 1, wherein a radius of curvature of the plurality of micro-mirrors forms a focal length equal to a beam path length from micro-mirror to opposing filter.

11. The flow cytometer of claim 1, wherein each of the plurality of filters is a dichroic filter.

12. The flow cytometer of claim 1, wherein each of the plurality of filters is a bandpass filter.

13. The flow cytometer of claim 1, wherein each of the plurality of filters are a combination of a dichroic filter and a bandpass filter coupled in light communication.

14. The flow cytometer of claim 1, wherein wherein the light directed by each of the plurality of micro-mirrors is collimated onto even filters.

15. The flow cytometer of claim 1, wherein wherein the plurality of micro-mirrors in the row of the first image array are concave spherical mirrors.

16. The flow cytometer of claim 1, wherein wherein the plurality of micro-mirrors in the row of the first image array are concave rectangular mirrors.

17. The flow cytometer of claim 5, wherein wherein the plurality of micro-mirrors in the row of the first and second image arrays are concave spherical mirrors.

18. The flow cytometer of claim 5, wherein wherein the plurality of micro-mirrors in the row of the first and second image arrays are concave rectangular mirrors.

* * * * *